US007605936B2

(12) United States Patent
Uchida et al.

(10) Patent No.: US 7,605,936 B2
(45) Date of Patent: Oct. 20, 2009

(54) PRINT JOB CREATION APPARATUS AND PRINT JOB CREATION AND OUTPUT METHOD

(75) Inventors: Yasuhiko Uchida, Nagano-ken (JP);
Yukio Takahashi, Nagano-ken (JP);
Hiroyasu Tamagawa, Nagano-ken (JP);
Satoru Momose, Nagano-ken (JP);
Kazunori Shimoda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1005 days.

(21) Appl. No.: 10/830,800

(22) Filed: Apr. 22, 2004

(65) Prior Publication Data

US 2004/0263906 A1    Dec. 30, 2004

(30) Foreign Application Priority Data

Apr. 25, 2003 (JP) ............................. 2003-122396

(51) Int. Cl.
G06F 3/12 (2006.01)
G06K 15/00 (2006.01)
H04N 1/00 (2006.01)

(52) U.S. Cl. .................. 358/1.15; 358/1.16; 358/2.1; 358/401; 358/403

(58) Field of Classification Search ................ 358/1.15, 358/1.16, 2.1, 403, 401
See application file for complete search history.

(56) References Cited

U.S. PATENT DOCUMENTS

2002/0059431 A1    5/2002    Terada (Continued)

FOREIGN PATENT DOCUMENTS

JP    2002-041891    2/2002

(Continued)

OTHER PUBLICATIONS

A.I. Soft. Inc., "Digital Camera de!! Doji Print (Simultaneous Printing with Digital Camera)," User'Manual, 1st ed. (Jul. 2002), pp. 100-105 (with partial English translation).

(Continued)

*Primary Examiner*—Edward L Coles
*Assistant Examiner*—Thomas J Lett
(74) *Attorney, Agent, or Firm*—Martine Penilla & Gencarella, LLP

(57) ABSTRACT

A print job creation apparatus of the invention connecting with a local network uses an output destination setting window 66 to set an output destination for output of a print job under creation or a created print job with respect to each combination of a print service and a paper size in a tabular form. Each setting field in the output destination setting window 66 includes an output destination setting box 67 on the upper row to set a selected output destination, a paper type setting box 68 on the middle row to set a selected type of printing paper, and an output step setting box 69 on the lower row to set a selected print job creation step for output of a print job to the output destination. A pulldown menu is open in the output destination setting box 67 to give available options including other print job creation apparatuses and printers connecting with the same local network and other print job creation apparatuses and printers connecting with a different local network. A print job is output to the preset output destination, in response to an interruption command to interrupt creation of the print job in the middle or in response to an execution command to execute the print job.

21 Claims, 22 Drawing Sheets

U.S. PATENT DOCUMENTS

2002/0140969 A1 10/2002 Ishida
2002/0156796 A1 10/2002 Hisamatsu et al.
2002/0159807 A1* 10/2002 Ishida .......................... 400/76

FOREIGN PATENT DOCUMENTS

| JP | 2002-204266 | 7/2002 |
|---|---|---|
| JP | 2002-259768 | 9/2002 |
| JP | 2002-297491 | 10/2002 |
| JP | 2002-297740 | 10/2002 |

OTHER PUBLICATIONS

Abstract of Japanese Patent Publication No. 2002-041891, Pub. Date: Feb. 8, 2002, Patent Abstracts of Japan.
Abstract of Japanese Patent Publication No. 2002-204266, Pub. Date: Jul. 19, 2002, Patent Abstracts of Japan.
Abstract of Japanese Patent Publication No. 2002-259768, Pub. Date: Sep. 13, 2002, Patent Abstracts of Japan.
Abstract of Japanese Patent Publication No. 2002-297491, Pub. Date: Oct. 11, 2002, Patent Abstracts of Japan.
Abstract of Japanese Patent Publication No. 2002-297740, Pub. Date: Oct. 11, 2002, Patent Abstracts of Japan.

* cited by examiner

FIG.18

| Job ID of Print Job to be Sent |
| Apparatus ID of Sneder |
| Apparatus ID of Receiver |
| Printer ID of Output Destination |
| Paper Type |
| Current Step in Print Job Creation Process |
| Date and Time of Transmission |
| Job Data |

PRINT JOB CREATION APPARATUS AND PRINT JOB CREATION AND OUTPUT METHOD

BACKGROUND OF THE INVENTION

1. Field of the Invention

The present invention relates to a print job creation apparatus and a print job creation and output method. More specifically the invention pertains to a print job creation apparatus that creates a print job with respect to a print service selected among multiple print service options, as well as to a print job creation and output method that causes a computer to create and output a print job with respect to a print service selected among multiple print service options.

2. Description of the Prior Art

Proposed print job creation apparatuses function to read picture images taken with a digital camera, introduce simple modifications of the images, incorporate the images in a layout, such as a postcard or an album, and set printing conditions. These prior art apparatuses read photographs, classify the photographs into desired categories to be stored like films, and create print jobs. The print job creation process includes a film selection step, a print service selection step of selecting a desired print service, for example, postcard printing, album printing, or calendar printing, a photograph selection step of selecting photographs to be printed, a print setting step of specifying settings of a style, a print option, and a printer, a layout adjustment step of adjusting a layout of pages with photographs incorporated therein, and a print step of finely adjusting the printing position, inputting the number of copies, and giving a print execution instruction. At the print setting step, a conventionally used printer for a certain OS (operating system) is set to a default printer in a printer selection box, and the user may change the default printer to another printer selected in a pulldown menu (see 'Digital Camera de!! Doji Print (Simultaneous Printing with Digital Camera) 6, User's Manual, $1^{st}$ ed. A. I. Soft. Inc., July 2002, p. 100-104).

Such prior art print job creation apparatuses are mainly designed for general household use and accordingly have only a low printing efficiency in business use. In general household use, only one printer, which is capable of printing to a size A4 or a size B4, is typically connected to a computer and is used for printing. The printer is thus naturally set to the default printer. In business use, however, multiple printers having different printable paper sizes and various paper types are generally used for printing. Selection of a suitable printer for each print job undesirably lowers the printing efficiency. This prior art apparatus requires a continuous flow of creation to execution of each print job as a consecutive series of processing. It is accordingly not allowed to divide the labor of creation and execution of a print job into multiple operators. This results in poor working efficiency.

SUMMARY OF THE INVENTION

The print job creation apparatus and the print job creation and output method of the invention aim to divide the labor of creating and executing each print job. The print job creation apparatus and the print job creation and output method of the invention also aim to output a print job to another print job creation apparatus or a computer connecting with a different local network. The print job creation apparatus and the print job creation and output method of the invention further aim to easily set an output destination suitable for a print job.

At least part of the above and other related objects is attained by the following configuration of a print job creation apparatus and a corresponding print job creation and output method of the invention.

A print job creation apparatus of the invention creates a print job with respect to a print service selected among multiple print service options, and the print job creation apparatus includes: an output destination setting module that sets an output destination of print jobs for each print service; and a job output module that, when creation of an object print job is completed to at least a preset step in a print job creation process, outputs the object print job to an output destination set corresponding to a print service of the object print job, among output destinations set by the output destination setting module.

The print job creation apparatus of the invention sets an output destination of print jobs for each print service. When creation of an object print job is completed to at least a preset step in the print job creation process, the print job creation apparatus outputs the object print job to an output destination set corresponding to a print service of the object print job, among the settings of output destination. The object print job completed to the preset step in the print job creation process is thus automatically output to the preset output destination. The output destination takes over creation of the object print job, which has been completed to the preset step in the print job creation process, and executes a resulting print job on completion. This arrangement enables the labor of creating and executing each print job to be effectively divided and thus ensures efficient creation and execution of the print job.

In the print job creation apparatus of the invention, the output destination setting module may set, as one output destination, another print job creation apparatus located on a network, to which the print job creation apparatus is connected, and the output destination setting module may set, as one output destination, another print job creation apparatus located on a second local network that is linked via a global network with a first local network, to which the print job creation apparatus is connected. In this case, the output destination setting module may specify a management group name, such as a location or a shop name, in which the another print job creation apparatus is located, to set the another print job creation apparatus as one output destination.

In the print job creation apparatus of the invention, the output destination setting module may set, as one output destination, a print execution device located on a network, to which the print job creation apparatus is connected, and the job output module may output an object print job to the print execution device in response to an execution command of executing the object print job, when the print execution device is set as an output destination for a print service of the object print job. In this case, the output destination setting module may use a driver of the print execution device to set the print execution device as one output destination.

Further, in the print job creation apparatus of the invention, the output destination setting module may set, as one output destination, a print execution device located on a second local network that is linked via a global network with a first local network, to which the print job creation apparatus is connected, and the job output module may output an object print job to a management apparatus that manages the print execution device in response to an execution command of executing the object print job, when the print execution device is set as an output destination for a print service of the object print job. In this case, the output destination setting module may specify the print execution device and a management group name, such as a location or a shop name, in which the print execution device is located, to set the print execution device as one output destination, and the output destination setting module may use a driver of the print execution device to set the print execution device as one output destination.

In the print job creation apparatus of the invention, the output destination setting module may set an output destination of print jobs for each combination of the print service and a paper size. In this case, the output destination setting module may set an output destination of print jobs for each combination of the print service and a paper type.

In the print job creation apparatus of the invention, the output destination setting module may set an allowable output step in the print job creation process to allow the job output module to output a print job to a preset output destination, and the job output module may output an object print job, which is completed to a step on or after the allowable output step set by the output destination setting module, to an output destination set corresponding to a print service of the object print job.

Moreover, in the print job creation apparatus of the invention, the output destination setting module may set the output destination for each print service, in response to selection in a list of available options of output destination displayed in a selectable manner, and the output destination setting module may set the output destination for each print service in a tabular form. The multiple print services may include at least one of an enlargement printing service, a digest printing service, a calendar printing service, a postcard printing service, a photo name card printing service, an ID photograph printing service, a seal printing service, a label printing service, and an album printing service. In addition, the print job creation process may be a combination of at least part of an image registration step, a template selection step, a layout editing step, and a print instruction step.

The technique of the invention is not restricted to the applications of the print job creation apparatus discussed above, but may also be actualized by a corresponding print job creation and output method to create and output a print job.

BRIEF DESCRIPTION OF THE DRAWINGS

FIG. 18 shows the data structure of a job file as an example;

DESCRIPTION OF THE PREFERRED EMBODIMENTS

Figure 1:
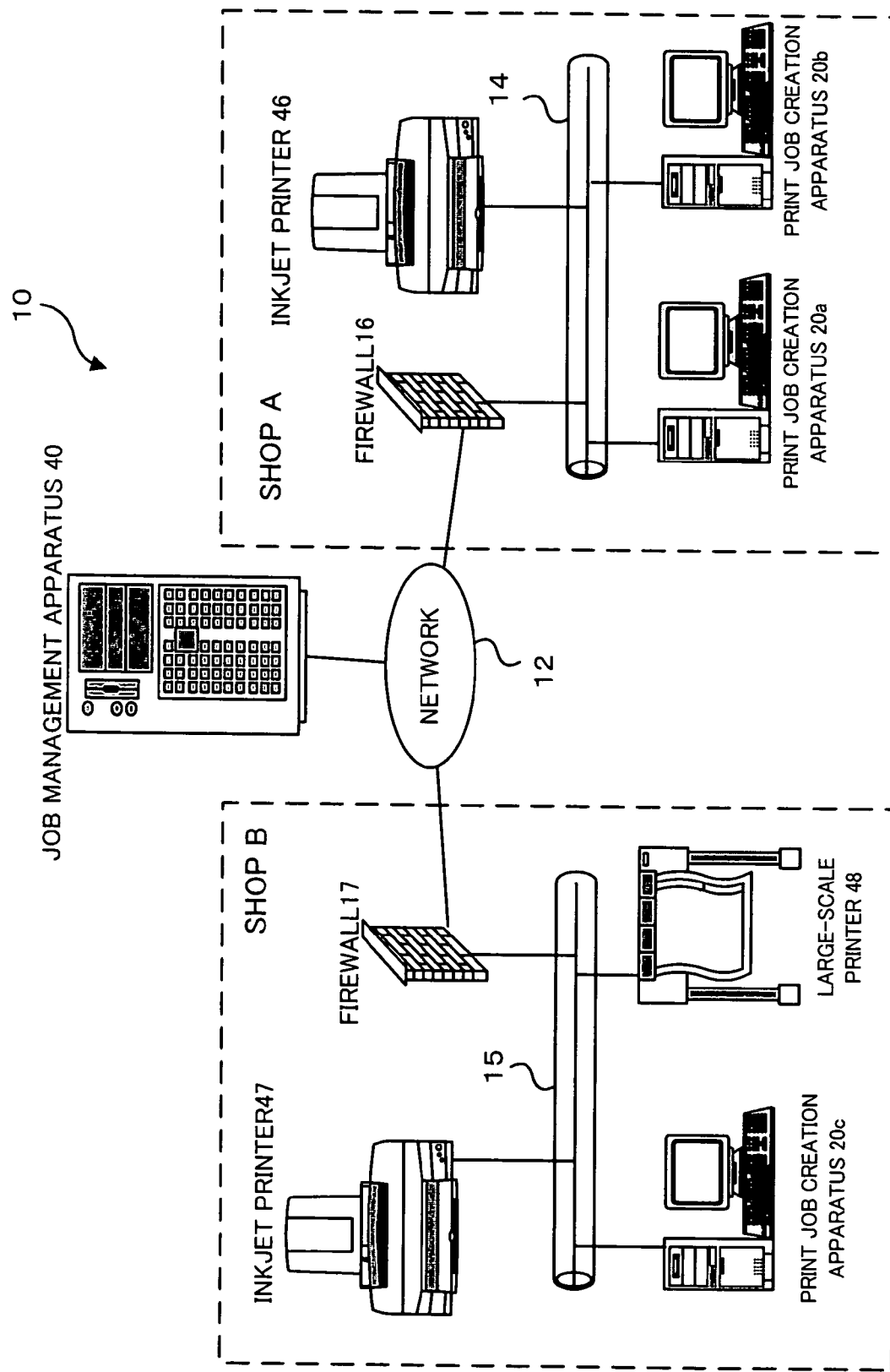
FIG. 1 schematically illustrates the configuration of a print job management system 10.

A preferred embodiment of the invention is discussed below. FIG. 1 schematically illustrates the configuration of a print job management system 10 including print job creation apparatuses 20a through 20c in one embodiment of the invention. In the illustrated print job management system 10 of the embodiment, a local network 14 connecting with the two print job creation apparatuses 20a and 20b and an inkjet printer 46 and a local network 15 connecting with the print job creation apparatus 20c, an inkjet printer 47, and a large-scale printer 48 are respectively connected to a global network 12, such as the Internet, via firewalls 16 and 17. A job management apparatus 40 is also connected to the network 12. For simplicity of explanation, it is assumed that the local network 14 is constructed in a shop A and that the local network 15 is constructed in a shop B. Namely the two print job creation apparatuses 20a and 20b and the inkjet printer 46 are connected to the local network 14 at the shop A, while the print job creation apparatus 20c, the inkjet printer 47, and the large-scale printer 48 are connected to the local network 15 at the shop B. The print job creation apparatuses 20a through 20c have identical structures and are thus generically referred to as the print job creation apparatuses 20 when discrimination of the respective apparatuses are not necessary.

Figure 2:
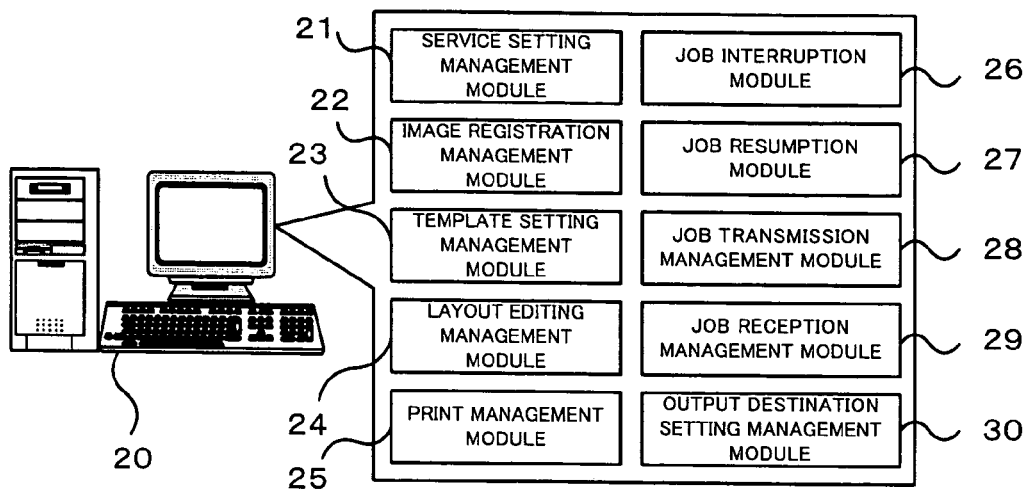
FIG. 2 shows the schematic construction of a print job creation apparatus 20.

FIG. 2 shows the schematic construction of the print job creation apparatus 20 of the embodiment. The print job creation apparatus 20 of the embodiment is constructed as a general computer, in which a non-illustrated print job creation program as application software and support data including template images used for printing are installed. Execution of the print job creation program causes the computer to function as the print job creation apparatus. The print job creation apparatus 20 of the embodiment creates print jobs as various print services including creation of calendars and creation of postcards and gives instructions of executing such print jobs. As shown in FIG. 2, the print job creation apparatus 20 has, as its functional blocks, a service setting management module 21 that accepts settings for creation of each print job from each of various print services, an image registration management module 22 that manages registration of images used for each print job, a template setting management module 23 that manages settings of templates used for each print job, a layout editing management module 24 that manages adjustment of a layout of images and editing of images, and a print management module 25 that manages settings of printing and printing instructions. The print job creation apparatus 20 also includes a job interruption module 26 that interrupts creation of a print job in the middle, a job resumption module 27 that resumes creation of a print job, which has been interrupted in the middle of its creation (here-after referred to as print job under creation), a job transmission management module 28 that manages transmission of each print job in response to a print execution instruction, a job reception management module 29 that manages reception of each print job sent from the job management apparatus 40 as an object to be printed, and an output destination setting management module 30 that sets output destination of each print job and manages the settings. The print job creation device 20 of the embodiment further includes a job input output management module that functions to send and receive each print job under creation to and from another print job creation apparatus 20 and a job duplication module that duplicates a print job under creation or an executed print job to start creation of a new print job, although these modules are not specifically illustrated. As matter of convenience, one or two print job creation apparatus 20a through 20c are connected to each of the local networks 14 and 15 in the illustration of FIG. 1. In the actual state, however, multiple print job creation apparatuses 20 may be connected to each of the local networks 14 and 15.

Each of the inkjet printers 46 and 47 is capable of high-quality color printing to a size A4, whereas the large-scale printer 48 is capable of high-quality color printing to a size A1. As matter of convenience, only one inkjet printer 46 is connected to the local network 14 and only one inkjet printer 47 and one large-scale printer 48 are connected to the local network 15 in the illustration of FIG. 1. In the actual state, however, a plurality of identical or different printers may be connected to each of the local networks 14 and 15.

Figure 3:
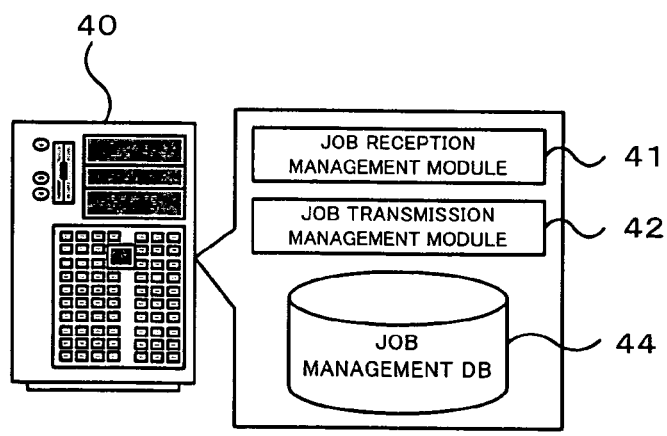
FIG. 3 shows the schematic construction of a job management apparatus 40.

FIG. 3 shows the schematic construction of the job management apparatus 40. The job management apparatus 40 is constructed as a management server that receives a file of each print job sent from each of the print job creation apparatuses 20 as an object to be printed and sends the file of the print job to another print job creation apparatus 20 specified as a transmission destination of the file. As illustrated, the job management apparatus 40 includes a job reception management module 41 that manages reception of a job file sent from each of the print job creation apparatuses 20, a job transmission management module 42 that manages transmission of each job file to a print job creation apparatus 20 specified as a transmission destination of the job file, and a job management database 44 that is used for management of reception of job files by the job reception management module 41 and for management of transmission of job files by the job transmission management module 42.

The following describes the operations of the print job creation apparatus 20 and the job management apparatus 40 of the embodiment constructed as discussed above. The description mainly regards the operations of the print job creation apparatus 20, in combination with the operations of the job management apparatus 40 according to the requirements.

Figure 4:
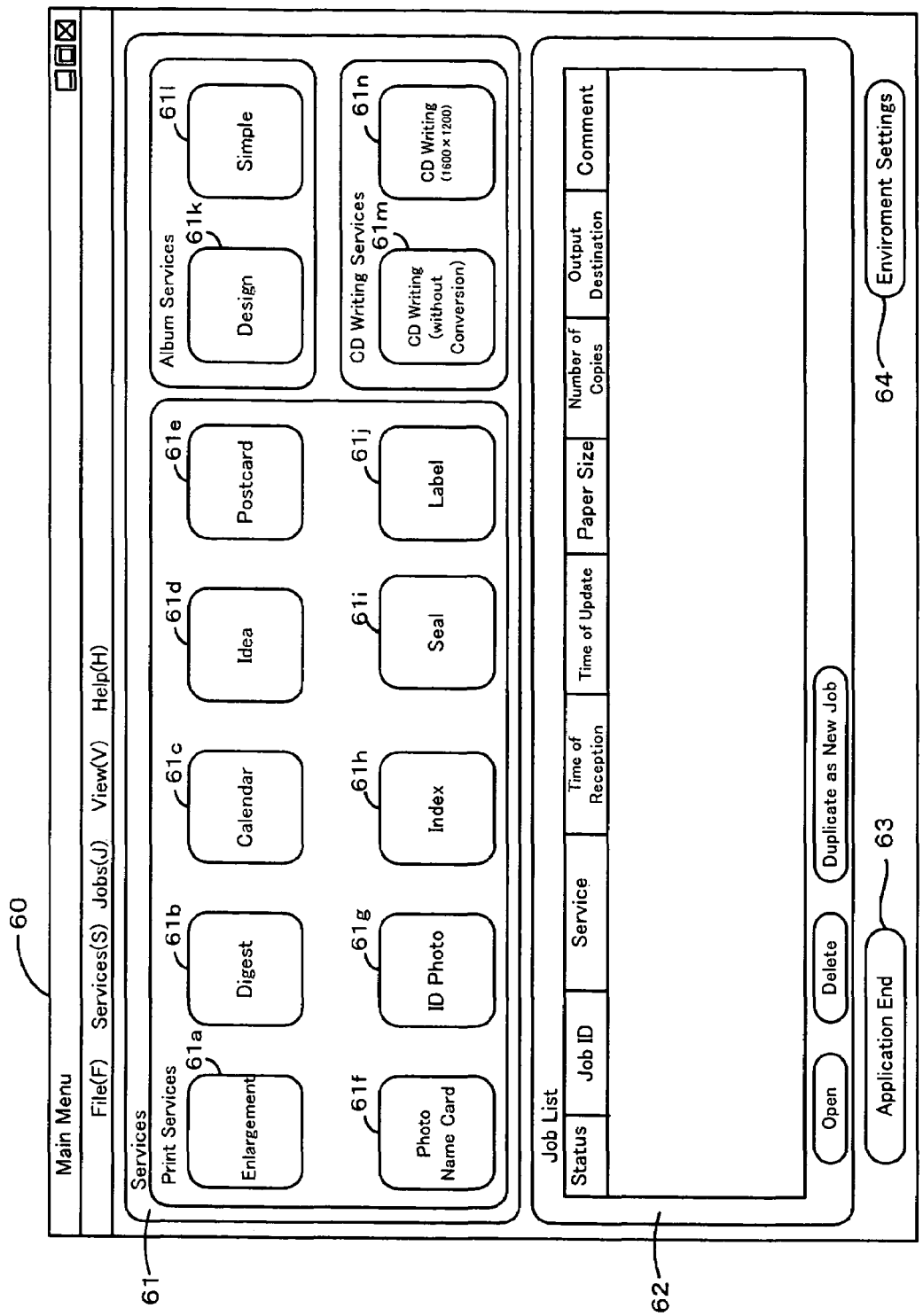
FIG. 4 shows an example of menu window 60.

FIG. 4 shows an example of menu window 60 open on the display of the print job creation apparatus 20 on startup of the non-illustrated print job creation program as the application software. The menu window 60 of FIG. 4 has a service selection field 61 for selecting a desired print service and a job list field 62 for displaying a list of print jobs. The service selection field 61 includes various selection buttons for print services, album services, and CD writing services. The buttons for print services include an 'Enlargement' button 61a to print an image in a large size, a 'Digest' button 61b to print multiple images as a digest, a 'Calendar' button 61c to print a calendar with images, an 'Idea' button 61d to print an image with any of templates of various designs, a 'Postcard' button 61e to print an image on a postcard, a 'Photo Name Card' button 61f to print name cards with a photograph, an 'ID Photo' button 61g to print an ID photograph, an 'Index' button 61h to print an index of a large number of images, a 'Seal' button 61i to create seals with an image, and a 'Label' button 61j to create labels for CDs and DVDs. The buttons for album services include a 'Design' button 61k to create an album with any of templates of various designs and a 'Simple' button 61l to create an album with a simple template. The buttons for CD writing services include a 'CD Writing (without Conversion)' button 61m to write an image into a CD without any conversion and a 'CD Writing (1600×1200)' button 61n to alter the size of an image to 1600×1200 and write the image of the altered size into a CD. The status, the job ID, the selected service, the time of reception, the time of update, the paper size, the number of copies, the total number of prints, and the comment with regard to respective print jobs under creation are listed in the job list field 62. The menu window 60 also has an 'Application End' button 63 and an 'Environment Settings' button 64 for settings of an image fetch source, services, a work folder, CD writing, and color management, which are both located below the job list field 62.

Figure 5:
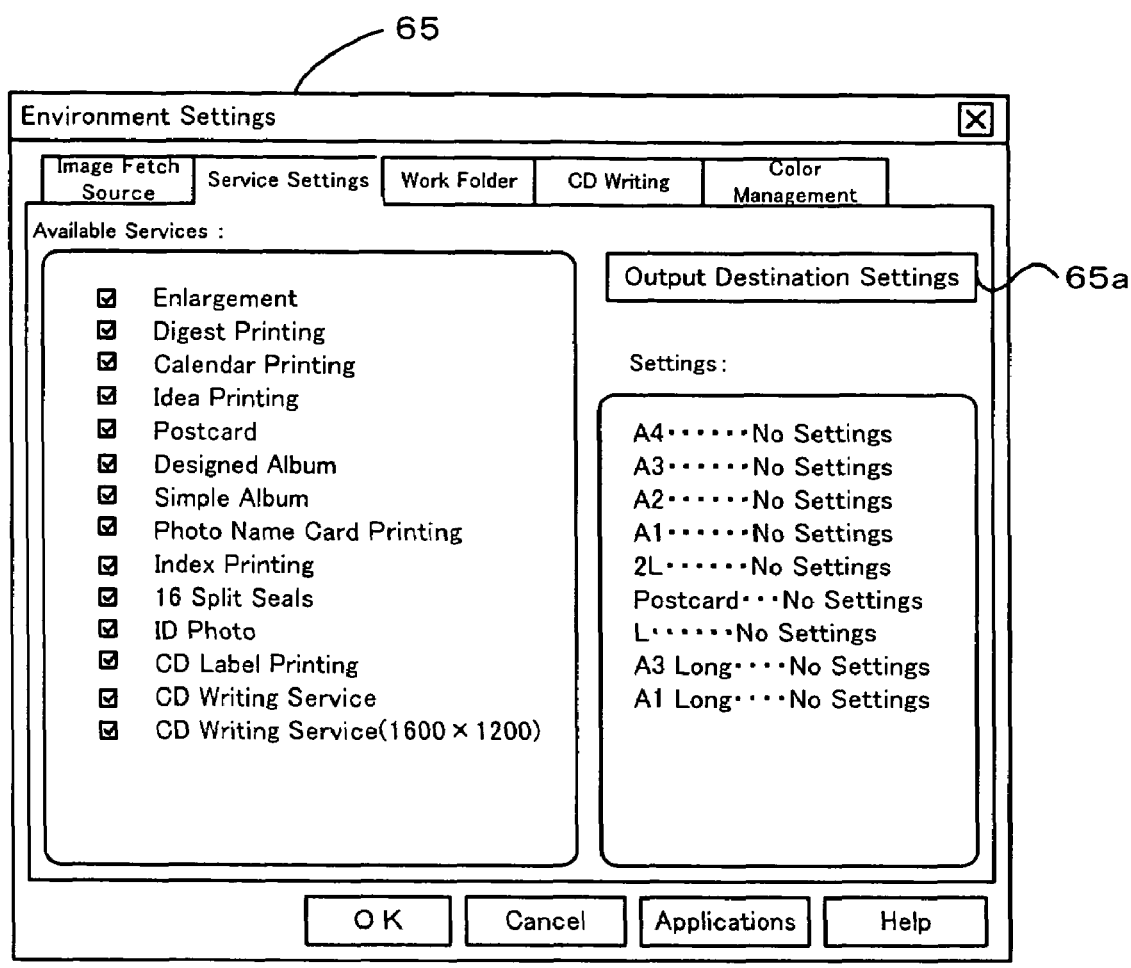
FIG. 5 shows an example of environment settings selection window 65.
Figure 6:
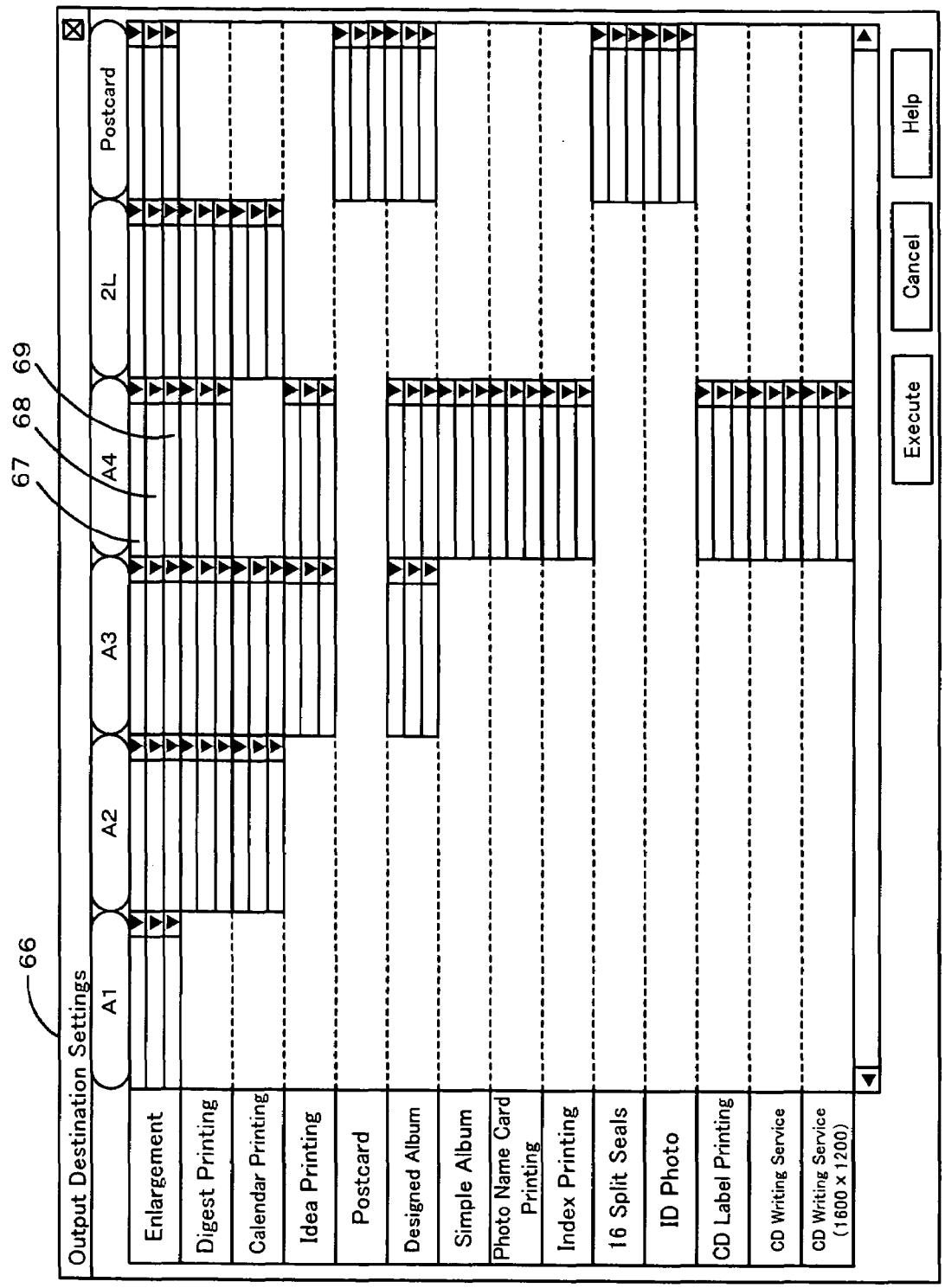
FIG. 6 shows an example of output destination setting window 66.

FIG. 5 shows an example of environment settings selection window 65 open in response to a click of the 'Environment Settings' button 64. In the illustrated example of FIG. 5, a service settings dialog box is open. A click of an 'Output Destination Settings' button 65a in this service settings dialog box opens an output destination setting window 66 for settings of output destinations of print jobs. An example of the output destination setting window 66 is shown in FIG. 6. The output destination setting window 66 of the embodiment displays a list of available print services against printable paper sizes in a tabular form. An output destination is settable for each combination of a print service and a paper size. Each setting field includes an output destination setting box 67 on the upper row to set a selected output destination, a paper type setting box 68 on the middle row to set a selected type of printing paper, and an output step setting box 69 on the lower row to set a selected print job creation step for output of a print job to the output destination. Desired entries are respectively selected in the setting boxes 67, 68, and 69 among options of output destination, among options of paper type, and among options of print job creation step for output displayed in the form of pulldown menus 67a, 68a, and 69a.

Figure 7:
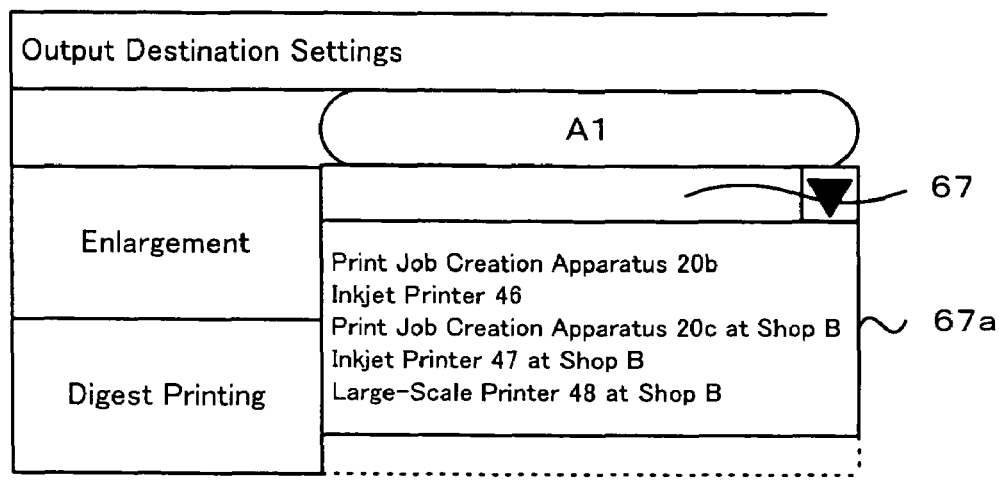
FIG. 7 shows a pulldown menu open in an output destination setting box 67.

FIG. 7 shows an example of the pulldown menu 67a open for the output destination setting box 67 by the print job creation apparatus 20a at the shop A. In this illustrated example, the pulldown menu 67a of the output destination setting box 67 shows options of output destination, that is, another print job creation apparatus 20b and the inkjet printer 46 connected to the local network 14 at the shop A and the print job creation apparatus 20c, the inkjet printer 47, and the large-scale printer 48 at the shop B. The user selects and sets a desired output destination to output a print job in the pulldown menu 67a of the output destination setting box 67 allocated to each combination of the print service and the paper size. When the user selects the print job creation apparatus 20b connected to the local network 14, the procedure sets an apparatus ID and an IP address allocated to the print job creation apparatus 20b as the output destination. When the user selects the printer (the inkjet printer 46) connected to the local network 14, the procedure sets, as the output destination, a printer driver name to use a printer driver for printing, which is installed in the print job creation apparatus 20a to make the selected printer usable by the print job creation apparatus 20a. When the user selects the print job creation apparatus 20c connected to the local network 15, the procedure sets an apparatus ID and an IP address allocated to the print job creation apparatus 20c as the output destination. When the user selects the printer (the inkjet printer 47 or the large-scale printer 48) connected to the local network 15, the procedure sets an apparatus ID of the relevant print job creation apparatus 20c, in which a printer driver of the selected printer is installed, among the print job creation apparatuses 20c connected to the local network 15, and a printer ID allocated to the selected printer. The options of output destination displayed in the pulldown menu 67a and their settings may be provided in the form of a table by each of the print job creation apparatuses 20. The table may alternatively be distributed from the job management apparatus 40 to each of the print job creation apparatuses 20.

Figure 8:
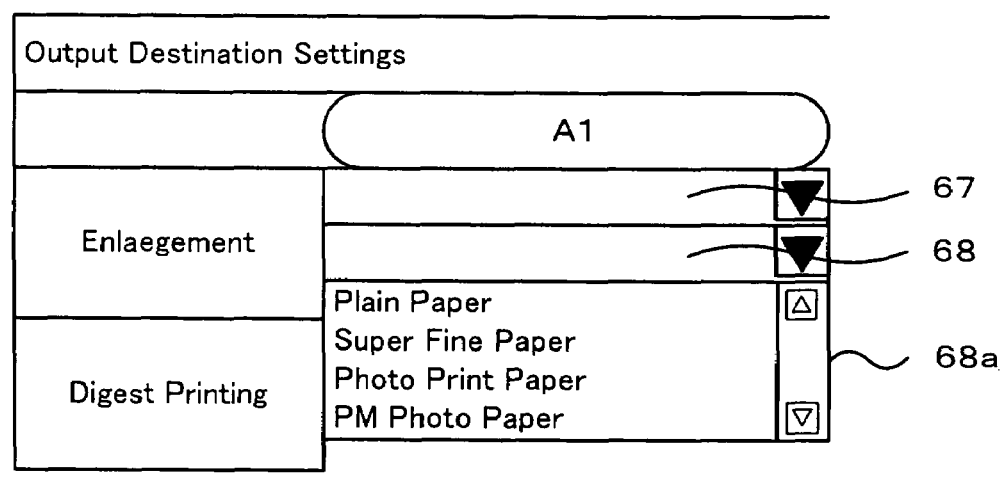
FIG. 8 shows a pulldown menu open in a paper type setting box 68.

FIG. 8 shows an example of the pulldown menu 68a open for the paper type setting box 68 by the print job creation apparatus 20a at the shop A. In this illustrated example, the pulldown menu 68a of the paper type setting box 68 shows options of paper type including plain paper, super fine paper, and photo print paper. The user selects a desired paper type as a default paper type in the pulldown menu 68a of the paper type setting box 68 allocated to each combination of the print service and the paper size.

Figure 9:
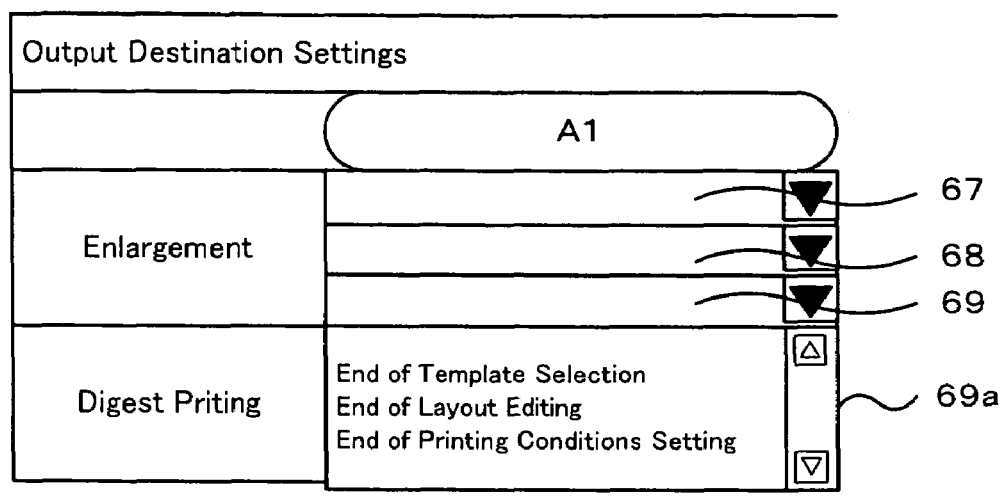
FIG. 9 shows a pulldown menu open in an output step setting box 69.

FIG. 9 shows an example of the pulldown menu 69a open for the output step setting box 69 by the print job creation apparatus 20a at the shop A. In this illustrated example, the pulldown menu 69a of the output step setting box 69 shows options of print job creation step for output including end of template selection, end of layout editing, and end of printing conditions setting. The user selects a desired print job creation step for output in the pulldown menu 69a of the output step setting box 69 allocated to each combination of the print service and the paper size, so as to output a print job, which has been processed to the selected print job creation step, to the output destination set in the output destination setting box 67. In the case of selection of any printer as the output destination in the output destination setting box 67, none of the print job creation step options are inactive to be in the unselectable state in the pulldown menu 69a of the output step setting box 69. This effectively prevents a print job under creation from being mistakenly output to the printer.

The user is allowed to output a print job, which has been processed to the print job creation step set in the output step setting box 69, with respect to each combination of the print service and the paper size in the output destination setting window 66 to the output destination set in the output destination setting box 67. The output destination setting management module 30 executes and manages these settings of the output destination, the paper type, and the print job creation step for output of the print job.

Figure 10:
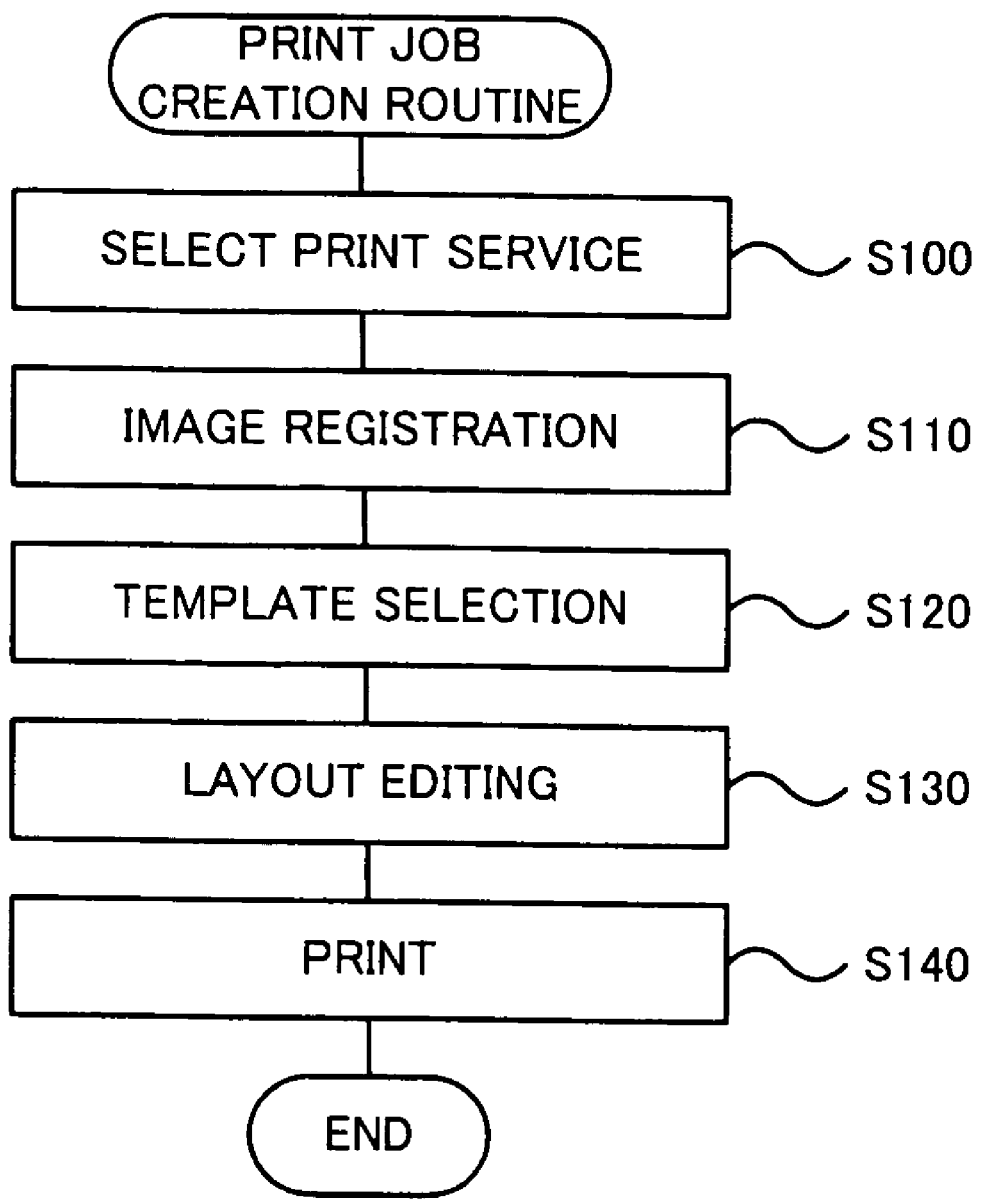
FIG. 10 is a flowchart showing a print job creation routine.

The print job creation apparatus 20 of the embodiment creates a print job according to a print job creation routine shown in FIG. 10. The print job creation routine first receives selection of a desired print service (step S100). The user clicks one of the available service buttons 61a through 61m in the service selection field 61 of the menu window 60 shown in FIG. 4 to select a desired print service. The service setting management module 21 of the print job creation apparatus 20 manages display of the menu window 60, acceptance of selection of a service, and start of creation of a print job in the selected service.

Figure 11:
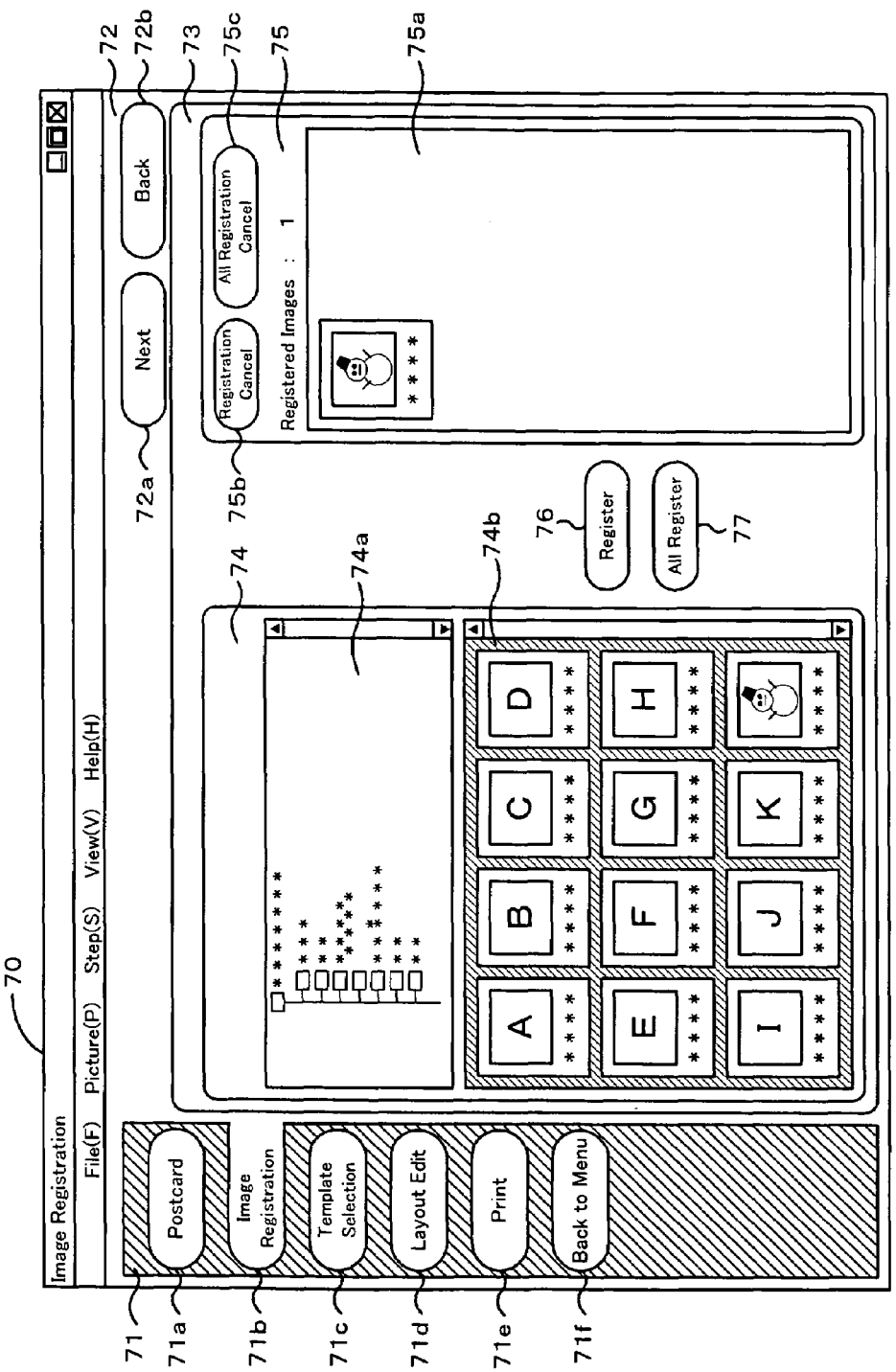
FIG. 11 shows an example of image registration window 70.

In response to selection of a desired print service, the print job creation apparatus 20 of the embodiment opens an image registration window 70 shown in FIG. 11 and executes an image registration step to register images used for the selected print service (step S110). In the illustrated example of FIG. 11, the image registration window 70 has a process display field 71 to display a print job creation process and an image registration dialog box 72 to register selected images. The process display field 71 includes a 'Selected Service Display' button 71a to display a selected print service, an 'Image Registration' button 71b, a 'Template Selection' button 71c, a 'Layout Edit' button 71d, and a 'Print' button 71e showing steps in the print job creation process, and a 'Back to Menu' button 71f to interrupt creation of a current print job and go back to the menu window 60. The image registration dialog box 72 is displayed in connection with the 'Image Registration' button 71b and is open when the print job creation process is at the image registration step.

The image registration dialog box 72 has a work field 73, which includes an image selection field 74 to receive the user's selection of a storage place (a directory or a folder), in which images are stored, and display a list of thumbnails and file names of images stored in the selected storage place and a registered image display field 75 to display a list of thumbnails and file names of registered images. The work field 73 also has a 'Register' button 76 to register an image selected in the image selection field 74 and display the registered image in the registered image display field 75 and an 'All Register' button 77 to register all the images displayed in the image selection field 74 and display all the registered images in the registered image display field 75. The user selects a desired image storage place in a storage place display field 74a of the image selection field 74, selects a desired image among images displayed in an image display field 74b of the image selection field 74 in response to selection of the storage place (that is, among images stored in the selected storage place), and clicks the 'Register' button 76. The desired image is accordingly registered and displayed in an image display field 75a of the registered image display field 75. The registered image display field 75 also has a 'Registration Cancel' button 75b to cancel registration of an image selected in the image display field 75a and an 'All Registration Cancel' button 75c to cancel registration of all registered images. The image registration dialog box 72 also has a Next' button 72a to terminate the image registration step and to go to a next step in the print job creation process and a 'Back' button 72b to go back to a previous step in the print job creation process. A click of the 'Back' button 72b in the image registration window 70 terminates the image registration step and reopens the menu window 60. The 'Back' button 72b accordingly has the same function as that of the 'Back to Menu' button 71f. The image registration management module 22 of the print job creation apparatus 20 manages this image registration step.

Figure 12:
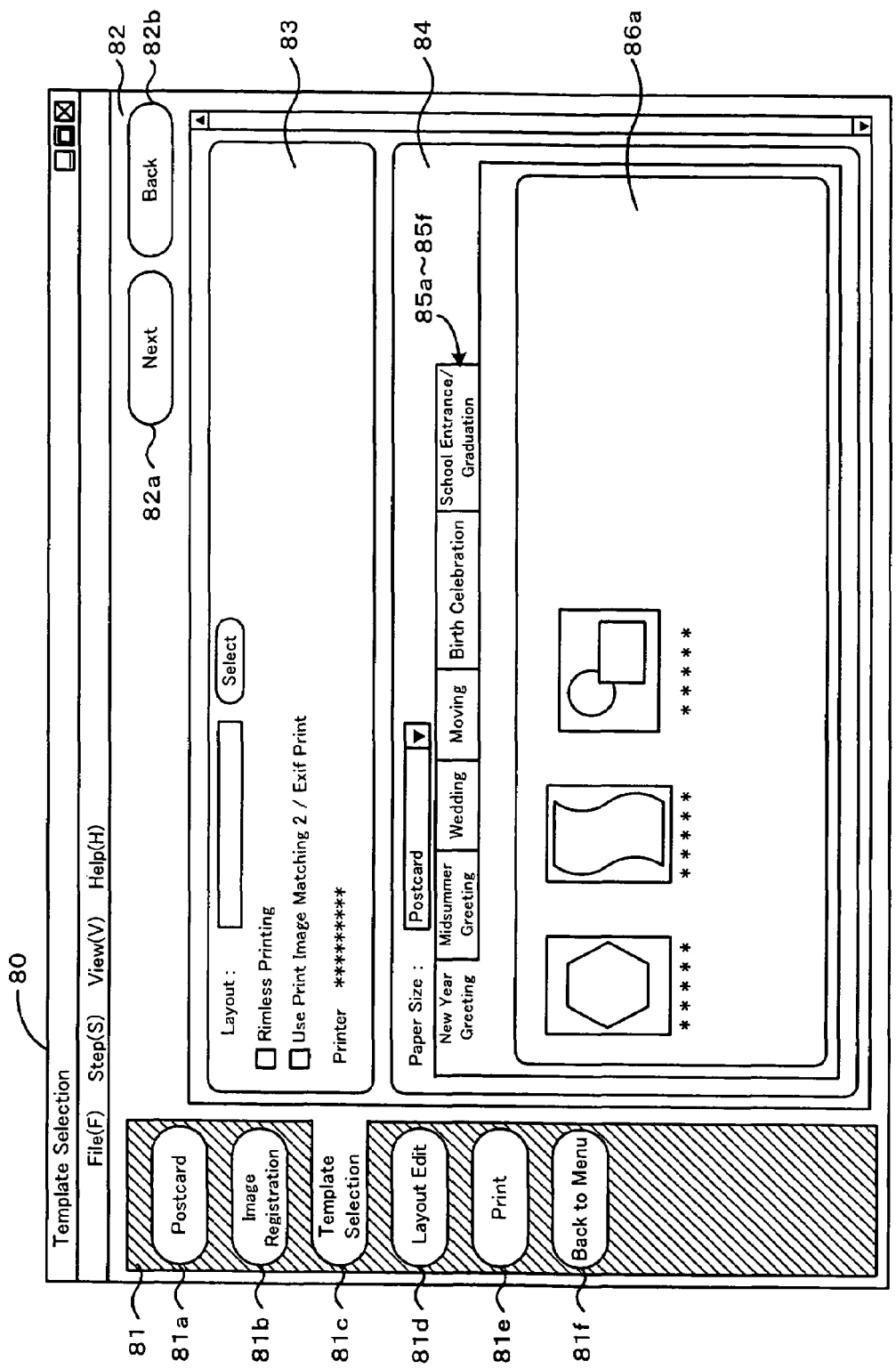
FIG. 12 shows an example of template selection window 80.

In response to a click of the 'Next' button 72a after registration of one or multiple desired images, the print job creation routine opens a template selection window 80 shown in FIG. 12 and executes a template selection step to select a desired template, in which the registered image is inserted (step S120). In the illustrated example of FIG. 12, the template selection window 80 includes a process display field 81, which is identical with the process display field 71 of the image registration window 70 shown in FIG. 11, and a template selection dialog box 82 to select a desired template. In this template selection window 80, the template selection dialog box 82 is displayed in connection with a 'Template Selection' button 81c in the process display field 81 and is open when the print job creation process is at the template selection step.

The template selection dialog box 82 has a setting field 83 to specify settings of a template and a template selection field 84 to select a desired template. The setting field 83 includes a layout input box for direct entry of a layout used as a template, a checkbox to set rimless printing, and a checkbox to effectuate image matching of a digital camera with a printer using 'Print Image Matching 2' and 'Exif Print'. The template selection field 84 has tags 85*a* through 85*f* corresponding to available template types. The respective tags 85*a* through 85*f* have template display fields 86*a* through 86*f* to display a list of thumbnails and file names of available templates. The user selects a desired tag among the tags 85*a* through 85*f* and selects a desired template among templates displayed in the template display field of the selected tag. In response to selection of the desired template, the selected file name is shown in the layout input box of the setting field 83. The template selection field 84 also has a paper size input box to select a desired paper size. The template selection dialog box 82 has a 'Next' button 82*a* to go to a next step and a 'Back' button 82*b* to go back to a previous step, like the image registration dialog box 72. A click of the 'Back' button 82*b* in the template selection window 80 reopens the image registration window 70, and the processing goes back to the previous step, that is, the image registration step (step S110) in the print job creation process. The template setting management module 23 of the print job creation apparatus 20 manages this template selection step.

Figure 13:
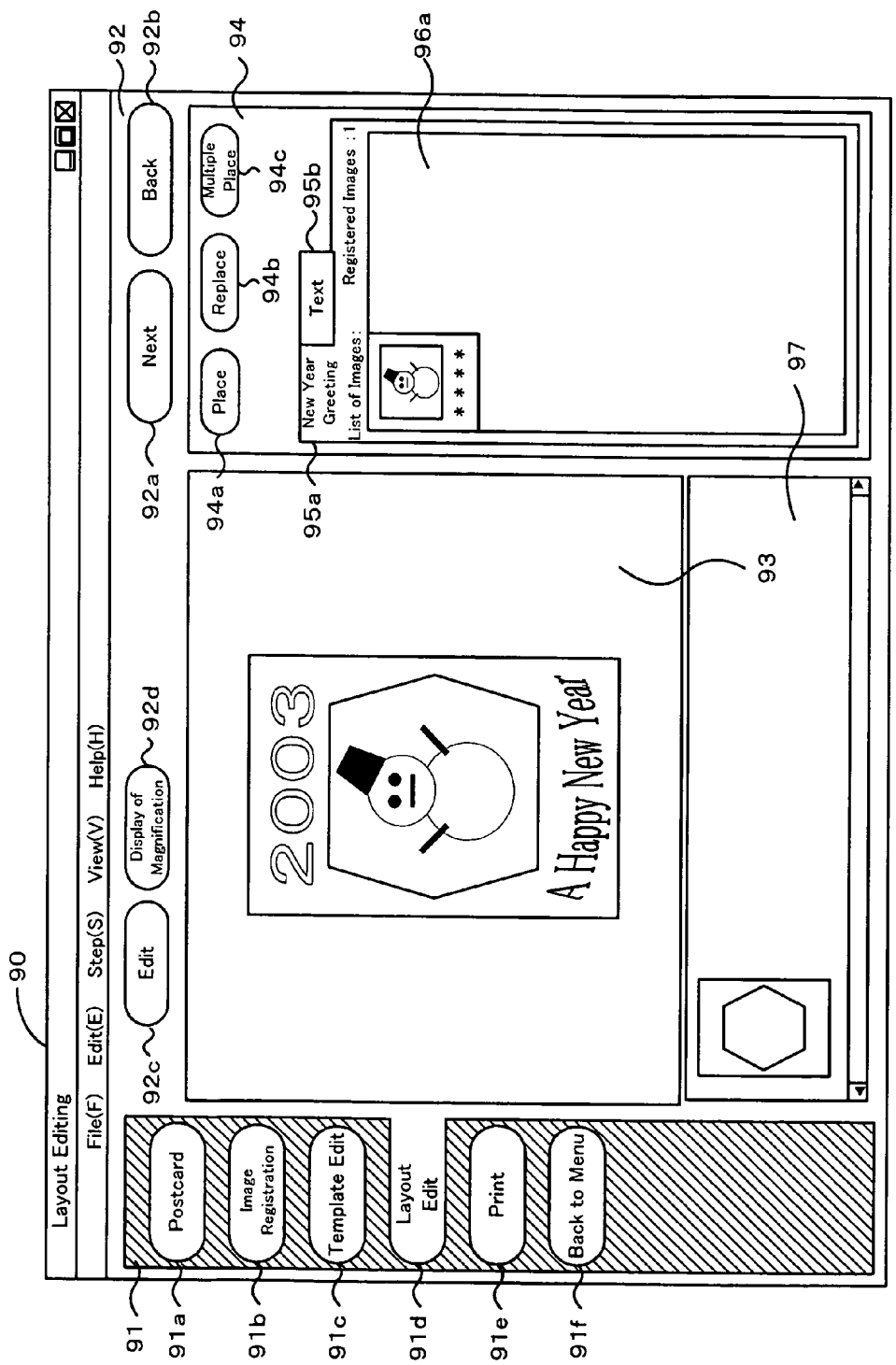
FIG. 13 shows an example of layout editing window 90.

In response to a click of the 'Next' button 82*a* after selection of the desired template, the print job creation routine opens a layout editing window 90 shown in FIG. 13 and executes a layout editing step to adjust a layout of images and edit the images (step S130). In the illustrated example of FIG. 13, the layout editing window 90 includes a process display field 91, which is identical with the process display fields 71 and 81 in the image registration window 70 of FIG. 11 and in the template selection window 80 of FIG. 12, and a layout editing dialog box 92 to layout and edit the images. In this layout editing window 90, the layout editing dialog box 92 is displayed in connection with a 'Layout Edit' button 91*d* in the process display field 91 and is open when the print job creation process is at the layout editing step.

The layout editing dialog box 92 includes a layout editing field 93 to combine the selected template with a registered image and thereby layout and edit the image, an image selection field 94 to select an image to be combined with the selected template, and a thumbnail display field 97 to display the thumbnail of the selected template. The image selection field 94 has a tag 95*a* for selecting a registered image and a tag 95*b* for writing a text. The tag 95*a* has an image display field 96*a* to display a list of registered images and their file names. The tag 95*b* has a text input box for entry of a desired text, although not being specifically illustrated. The image selection field 94 also has a 'Place' button 94*a* to place a selected image in the template displayed in the layout editing field 93, a 'Replace' button 94*b* to replace the selected image with an image currently placed in the template in the layout editing field 93, and a 'Multiple Place' button 94*c* to place the selected image in multiple areas of the template. The user may select a desired image among the images displayed in the image display field 96*a* of the tag 95*a* and click the 'Place' button 94*a*. This places the selected image in a specified area of the template. The user may select a desired image among the images displayed in the image display field 96*a* of the tag 95*a* and click the 'Replace' button 94*b*, while an image has already been placed in a specified area of the template in the layout editing field 93. This replaces the newly selected image with the current image in the specified area of the template. The user may select a desired image among the images displayed in the image display field 96*a* of the tag 95*a* and click the 'Multiple Place' button 94*c*. This places the selected image in multiple specified areas of the template. The layout editing dialog box 92 has a 'Next' button 92*a* to go to a next step and a 'Back' button 92*b* to go back to a previous step, like the image registration window 70 and the template selection window 80. The layout editing dialog box 92 also has an 'Edit' button 92*c* to edit the image combined with the template displayed in the layout editing field 93 and a 'Display Magnification' button 92*d* to change a display magnification in the layout editing field 93. When the user selects the image combined with the template displayed in the layout editing field 93 and clicks the 'Edit' button 92*c*, a pulldown menu is open to select a desired specification of editing among various options including rotation, frame rotation, vertical or horizontal inversion, trimming, die cutting, contour softening/sharpening, settings of lightness and contrast, color change, change to sepia/monochromatic, cross filter, red eye reduction, cloning, and auto correction. The output editing management module 24 of the print job creation apparatus 20 manages this layout editing step.

Figure 14:
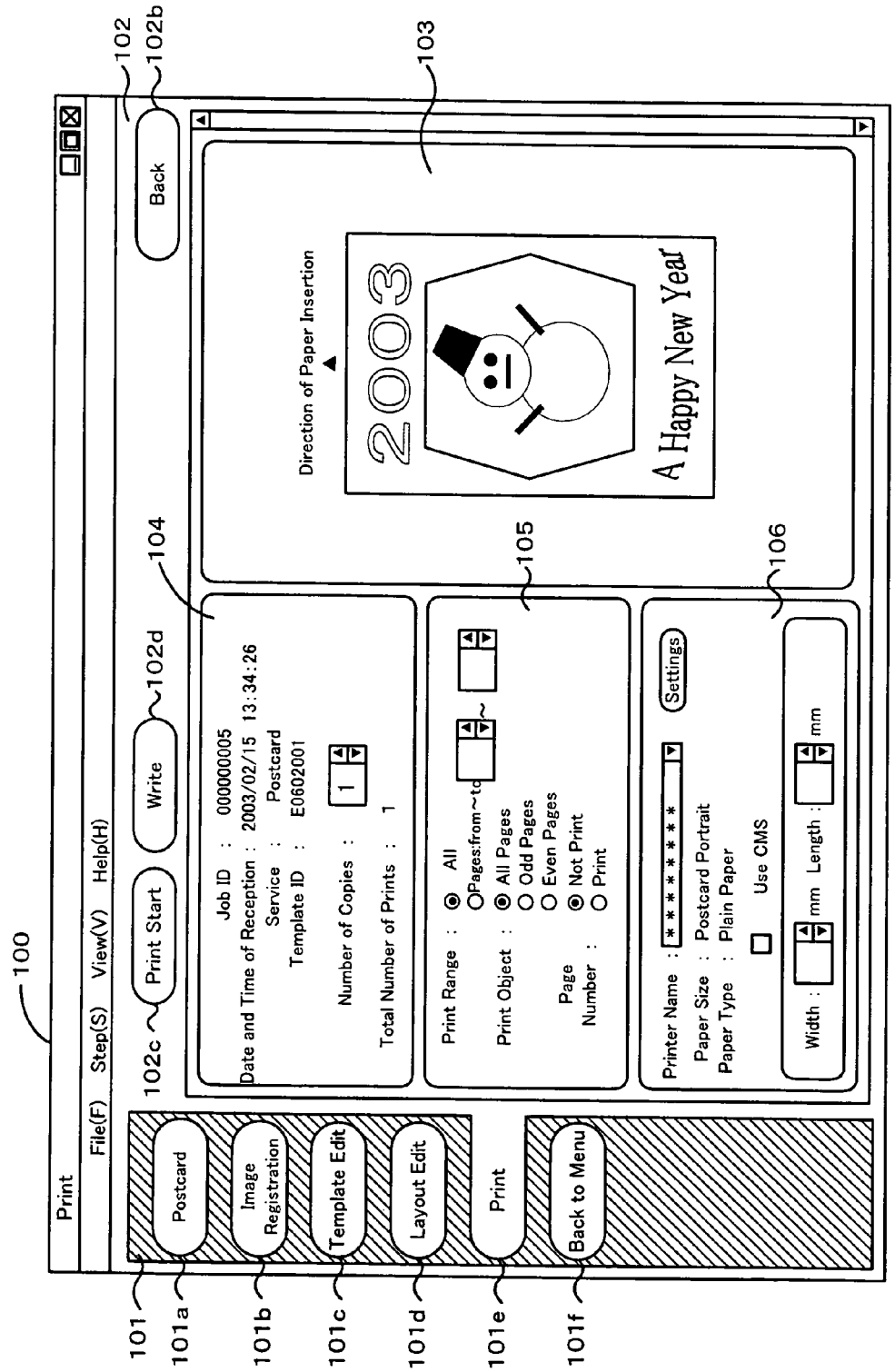
FIG. 14 shows an example of print window 100.

In response to a click of the 'Next' button 92*a* after layout of the image in the selected template and desired editing in the layout editing window 90, the print job creation routine opens a print window 100 shown in FIG. 14 and executes a print step to specify various settings for printing and execute printing (step S140). In the illustrated example of FIG. 14, the print window 100 includes a process display field 101, which is identical with the process display fields 71, 81, and 91 of the image registration window 70, the template selection window 80, and the layout editing window 90, and a print dialog box 102 to specify settings for printing and give a print execution instruction. In this print window 100, the print dialog box 102 is displayed in connection with a 'Print' button 101*e* in the process display field 101 and is open when the print job creation process is at the print step.

The print dialog box 102 has a printed image display field 103 to display a resulting image to be printed, which has been set in the template and gone through layout and editing, a job information display field 104 to display information regarding the print job, a printing condition setting field 105 to set printing conditions, and a printer setting field 106 to specify settings of the printer. The job information display field 104 shows the job ID, the date and time of reception, the service, and the template ID as information regarding the print job, and has a copy number input box to selectively enter a desired number of copies. The printing condition setting field 105 has radio buttons and an input box for setting a print range, radio buttons for setting a print object, and radio buttons for selecting either printing or non-printing of page numbers. The printer setting field 106 has a printer selection box to select a printer to be used for printing, a check box to select either application or non-application of color management system (CMS), and an area input box for setting a printing area. The printer setting field 106 also shows the settings of the paper size and the paper type in the selected printer. The printer selection box in the printer setting field 106 shows the default printer set for the selected combination of the print service and the paper size in the printer settings window 66 of FIG. 6 in the environment settings process. As the printer selected for execution of the print job, the default printer may be replaced by a printer selected among printer options displayed in a pulldown menu of the printer selection box in the printer setting field 106. The paper type displayed here is the paper type set for the selected combination of the print service and the paper size in the printer settings window 66 of FIG. 6 in the environment settings process. The print dialog box 102 also has a 'Back' button 102*b* to go back to a previous step, a 'Print Start' button 102*c* to give a print execution instruction, and a 'Write' button 102*d* to write a resulting image file into a desired directory or folder, instead of printing. The print job creation process executed by the print job creation apparatus 20 of the embodiment terminates in response to a click of the 'Print Start' button 102c or in response to a click of the 'Write' button 102d. The click of the 'Print Start' button 102c or the 'Write' button 102d starts execution of the created print job. The print job creation routine of FIG. 10 terminates at this stage. The print management module 25 of the print job creation apparatus 20 of the embodiment manages this print step.

The following describes a series of processing executed when creation of a print job is interrupted in the middle of the print job creation process, that is, in response to the user's click of any of the 'Back to Menu' buttons 71f, 81f, 91f, and 101f in the image registration window 70, the template selection window 80, the layout editing window 90, and the print window 100. This series of processing is executed by the job interruption module 26. In the following description, it is assumed that the print job creation apparatus 20a at the shop A executes the processing.

Figure 15:
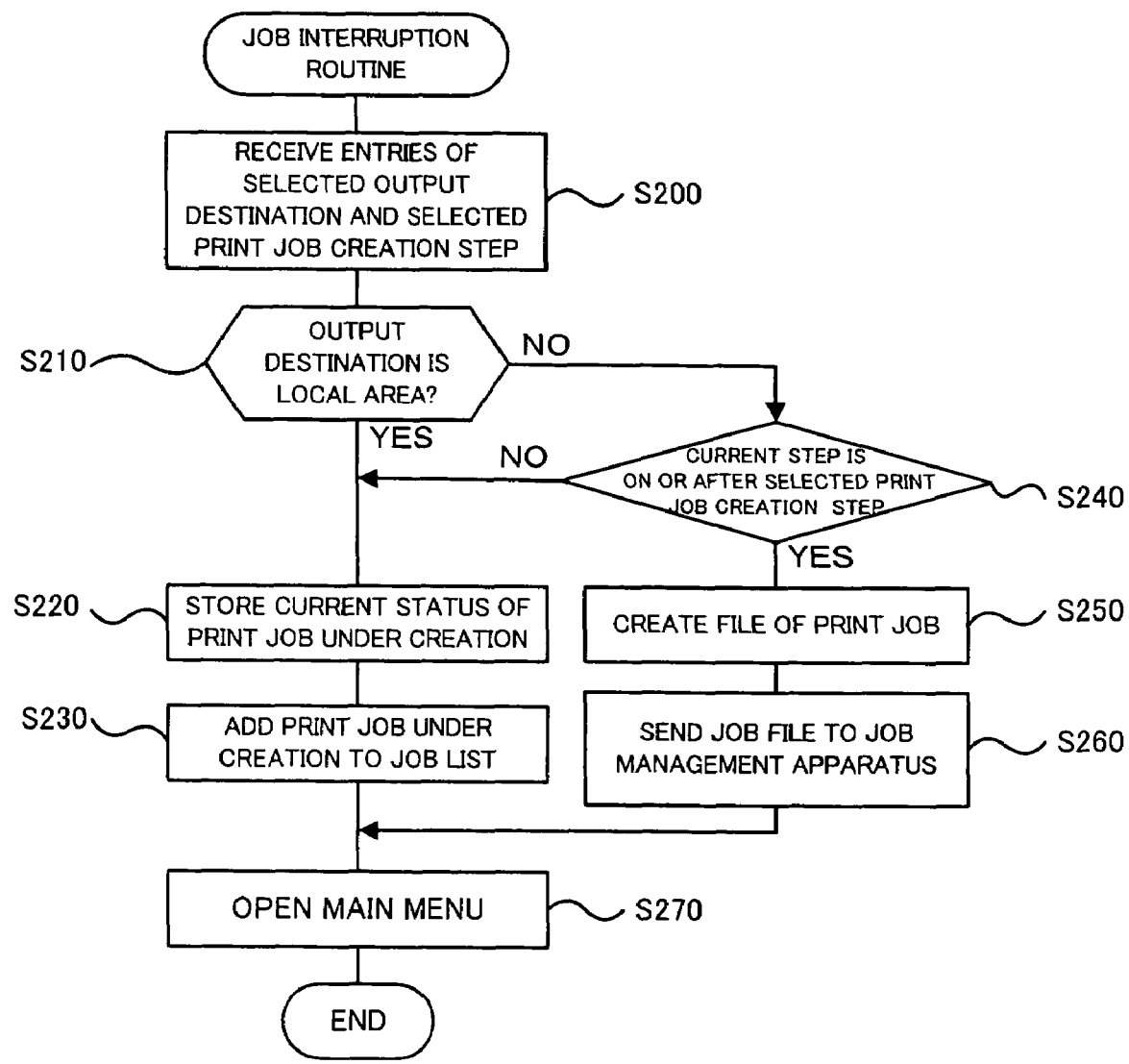
FIG. 15 is a flowchart showing a job interruption routine.

FIG. 15 is a flowchart showing a job interruption routine executed by the print job creation apparatus 20a, in response to a click of the 'Back to Menu' button 71f, 81f, 91f, or 101f in the corresponding window. When the job interruption routine starts, the print job creation apparatus 20a first receives the user's entries of the output destination to output a print job and the print job creation step for output of the print job set in the output destination setting window 66 with respect to the selected combination of the print service and the paper size for the print job (step S200). It is then determines whether the output destination is the local printer (the inkjet printer 46) connecting with the local network 14 at the shop A (step S210).

When the output destination is the local printer (the inkjet printer 46), the job interruption routine stores the current status of a print job under creation (step S220), adds the print job under creation to a job list in the job list field 62 on the menu window 60 (step S230), and opens the updated menu window 60 (step S270). This returns to the print service selection step (step S100 in the flowchart of FIG. 10) in the print job creation process for creation of a new print job.

Figure 16:
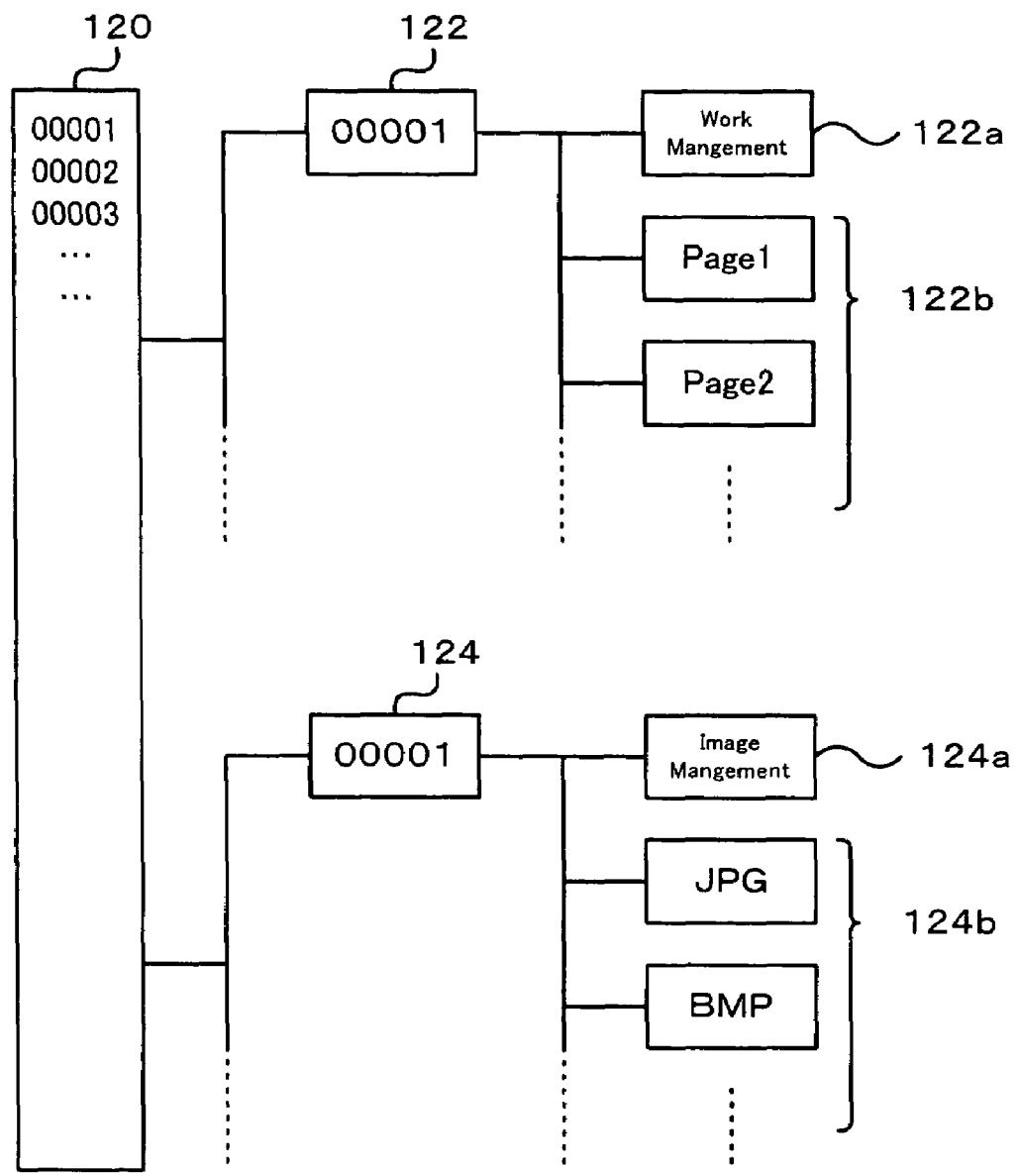
FIG. 16 shows an example of management of print jobs.
Figure 17:
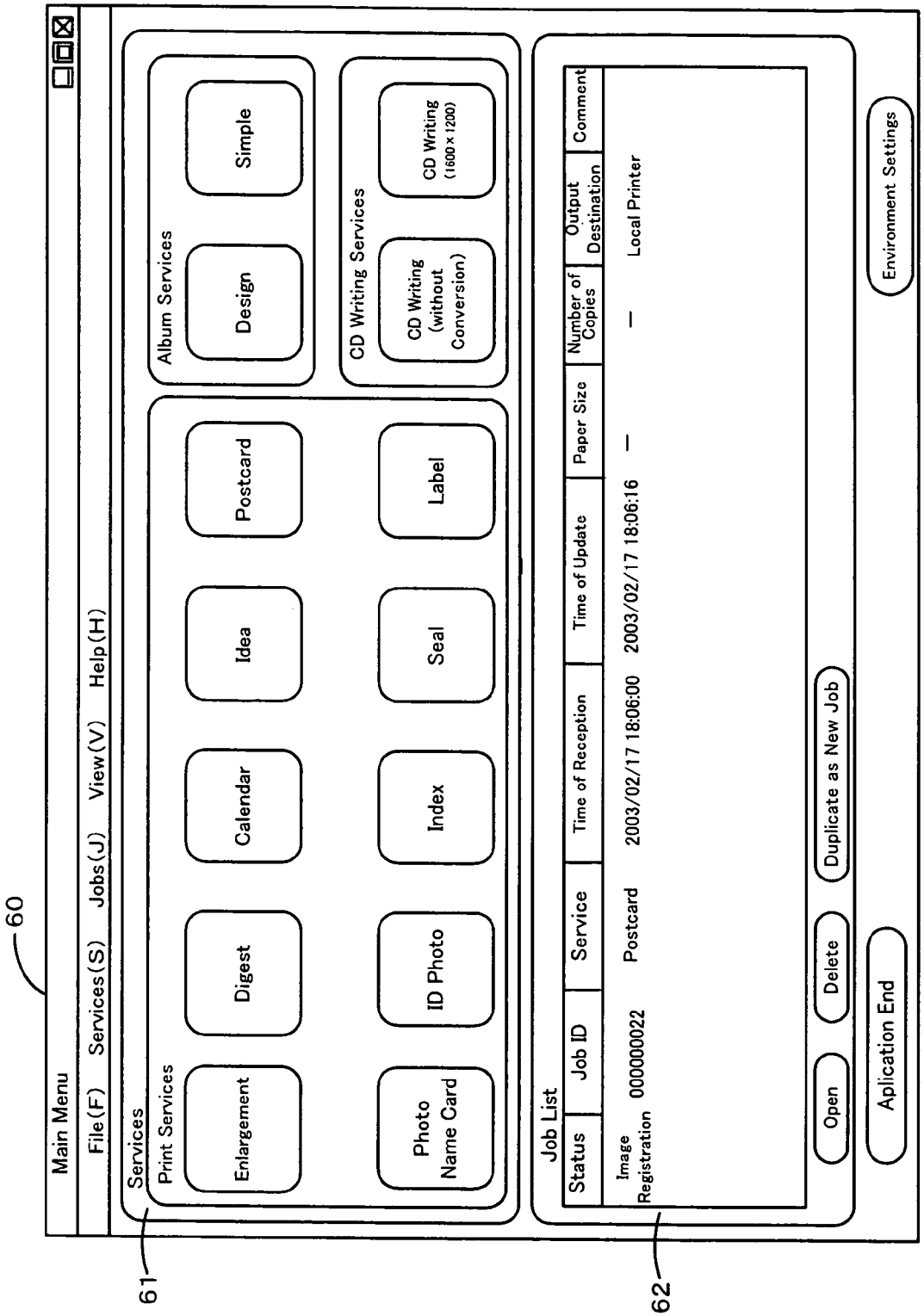
FIG. 17 shows the updated menu window 60 open in the course of processing.

FIG. 16 shows an example of management of print jobs under creation. In response to the user's selection of a desired print service, the management process allocates a job ID to each print job under creation, registers the print job under creation with the job ID in a job management file 120, and creates a management field 122. An image registration field 124 is provided on registration of a desired image in the image registration window 70. The management field 122 has a work management field 122a to store the job status representing the current step of a print job in the print job creation process and the file names of respective pages included in the print job under creation, and a page storage field 122b to store the respective pages. The page storage field 122b is provided on selection of a desired template, when the concept of pages arises. The image registration field 124 has an image management field 124a to store the file names and the file formats of the respective images and an image storage field 124b to store images classified into file formats. In the print job creation apparatus 20 of the embodiment, the concept of pages does not arise until selection of the template. The page storage field 122b of the management field 122 is thus generated in response to selection of a desired template, that is, when the print job creation process goes to the layout editing step. The storage process of storing the status of the print job at step S220 in the job interruption routine of FIG. 15 accordingly stores the job status in the work management field 122a, when the user clicks the 'Back to Menu' button 71f or 81f on the image registration window 70 or on the template selection window 80, prior to selection of a desired template. The storage process of step S220 stores the job status in the work management field 122a and the respective pages in the page storage field 122b, when the user clicks the 'Back to Menu' button 91f or 101f on the layout editing window 90 or on the print window 100 after selection of a desired template. FIG. 17 shows the updated menu window 60 open in response to a click of the 'Back to Menu' button 71f on the image registration window 70. The object print job under creation is additionally displayed in the job list field 62 on the menu window 60. The selected print job creation step and the selected output destination input at step S210 in the job interruption routine of FIG. 15 are respectively shown as the status and the output destination of the object print job under creation. The user is thus explicitly informed of the current step of the print job under creation in the print job creation process.

Referring back to the job interruption routine of FIG. 15, when the output destination is not the local printer (the inkjet printer 46) at step S210, it is subsequently determined whether the current step of an interrupted print job is on or after the selected print job creation step for output of the print job under creation to the output destination (step S240). When the current step of the interrupted print job is before the selected print job creation step, the job interruption routine stores the current status of the print job under creation (step S220), adds the print job under creation to a job list in the job list field 62 on the menu window 60 (step S230), and opens the updated menu window 60 (step S270), as in the case where the output destination is the local printer (the inkjet printer 46). The job interruption routine is then terminated. In this case, the selected output destination, for example, the printer name and the management group name (the shop B) is displayed as the output destination in the job list field 62 of the updated menu window 60

When the current step of the interrupted print job is on or after the selected print job creation step, on the other hand, the job interruption routine creates a file of the print job under creation (step S250) and sends the created job file to the job management apparatus 40 (step S260). The file creation process at step S250 in the job interruption routine of FIG. 15 creates a job file including the contents of the work management field 122a and the page storage field 122b in the state of job management shown in FIG. 16. FIG. 18 shows the data structure of a job file as an example. In this example, the job file includes a job ID, which is allocated to a print job to be sent and is set by the print job creation apparatus 20 at the time of transmission to the job management apparatus 40, an apparatus ID of the print job creation apparatus 20 as a sender, an apparatus ID of the print job creation apparatus 20 as a receiver, an ID allocated to a printer in the case of selection as the output destination (printer ID), the paper type, the current step of the print job in the print job creation process, the date and time of transmission, and job data including image data of the respective pages and settings for printing.

Figures 19, 20:
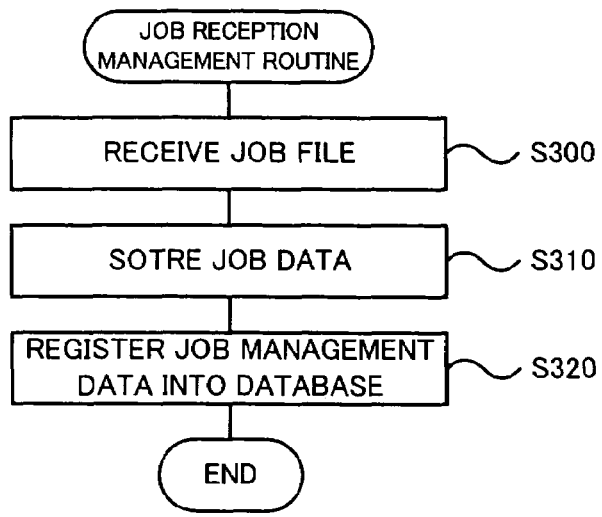
FIG. 19 is a flowchart showing a job reception management routine.
FIG. 20 shows the data structure of job management data as an example.

FIG. 19 is a flowchart showing a job reception management routine, which is executed by the job management apparatus 40 when the job management apparatus receives a job file sent from the print job creation apparatus 20. In the job reception management routine, the job management apparatus 40 receives a job file sent from the print job creation apparatus 20 (step S300), stores the job data included in the received job file into a non-illustrated storage device, such as a hard disk (step S310), and registers job management data for management of the job file into the job management database 44 (step S320). FIG. 20 shows the data structure of the job management data registered in the job management database 44 as an example. In this example, the job management data include a job number allocated to each print job in the order of registration, the job ID allocated to the print job to be sent, the apparatus ID of the print job creation apparatus 20 as the sender, the apparatus ID of the print job creation apparatus 20 as the receiver, the ID allocated to the printer in the case of selection as the output destination (printer ID), the paper type, the current step of the print job in the print job creation process, the date and time of reception of the job file, the date and time of transmission of the job file to the print job creation apparatus 20 as the receiver, and the storage destination of the job data. The respective data other than the 'date and time of transmission' are registered at step S310 in the job reception management routine. The 'date and time of transmission' is registered when the job file is sent to the print job creation apparatus 20 as the receiver.

Figure 21:
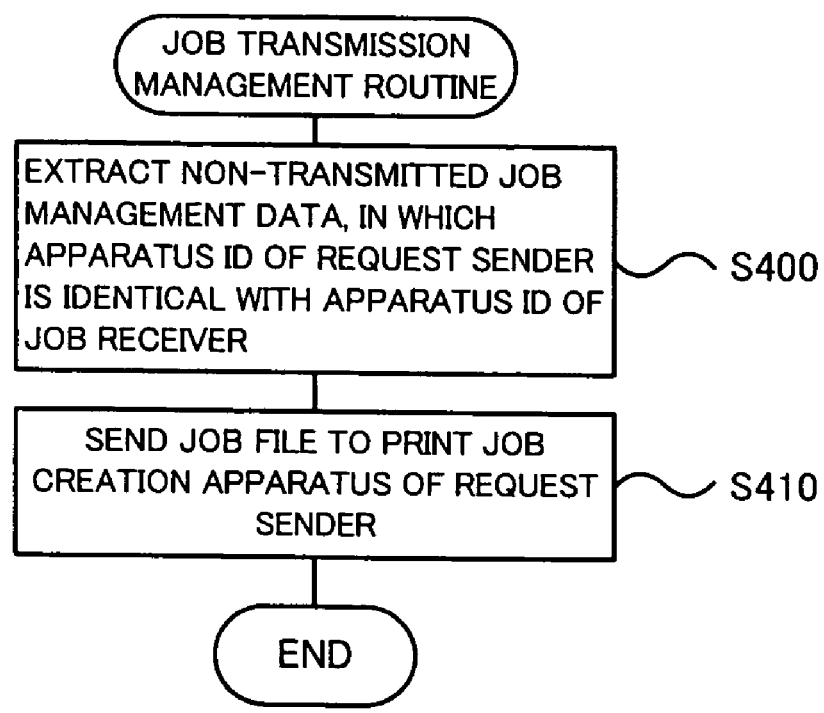
FIG. 21 is a flowchart showing a job transmission management routine.

When the print job creation apparatus 20 connecting with the local network 15 outputs a transmission request of a job file, the print job registered in the job management database 44 of the job management apparatus 40 is sent in the form of the job file to the print job creation apparatus 20 of the request sender. FIG. 21 is a flowchart showing a job transmission management routine, which is executed by the job management apparatus 40 when the print job creation apparatus 20 gives a transmission request of a job file. When the job transmission management routine starts, the job management apparatus 40 first extracts non-transmitted job management data, in which the apparatus ID of the print job creation apparatus 20 as the request sender is identical with the apparatus ID of the print job creation apparatus 20 as the job receiver, from the job management database 44 (step S400). The job management apparatus 40 then reads job data from the storage destination of job data specified in the job management data and sends the job data in the form of a job file to the print job creation apparatus 20 as the request sender (step S410). The date and time of this transmission are registered as the date and time of transmission in the job management data.

Figure 22:
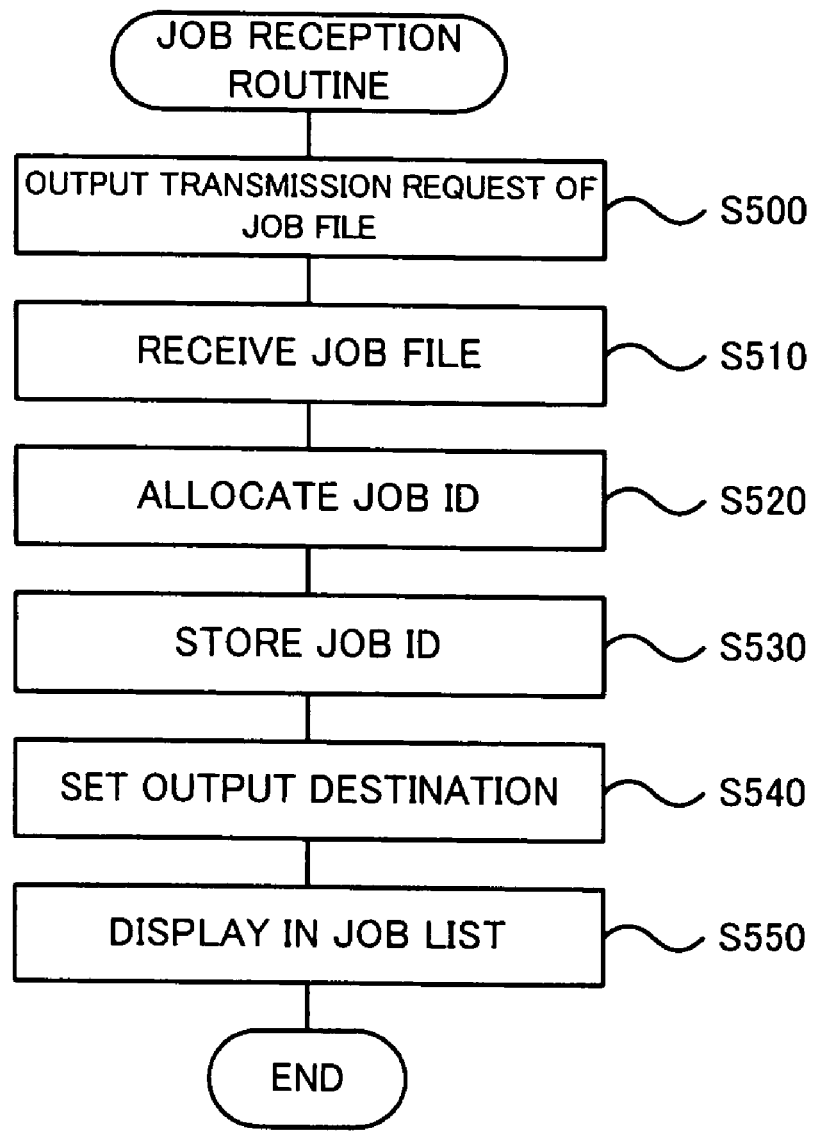
FIG. 22 is a flowchart showing a job reception routine.
Figure 23:
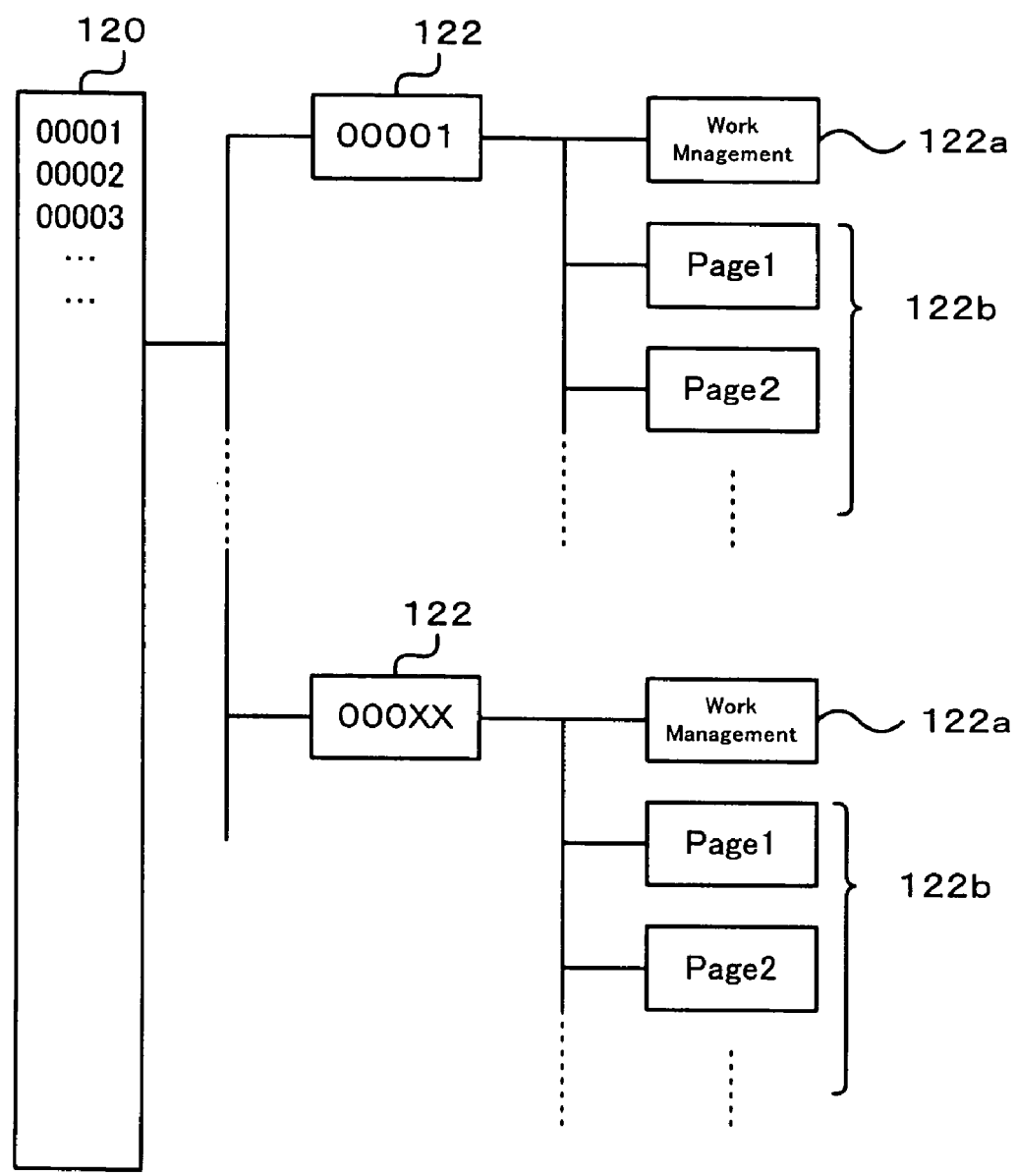
FIG. 23 shows an example of management of print jobs.

When the job file is sent from the job management apparatus 40, the print job creation apparatus 20c connecting with the local network 15 executes the processing on and after step S510 in a job reception routine shown in the flowchart of FIG. 22. The job reception routine of FIG. 22 also includes a step of outputting a transmission request of a job file to the job management apparatus 40 (step S500). When the job management apparatus 40 sends a job file in response to a transmission request of the job file, the print job creation apparatus 20c receives the transmitted job file (step S510) and allocates a job ID to the job file in the order of reception (step S520). The print job creation apparatus 20c subsequently creates the work management field 122a and page storage field 122b of the management field 122 corresponding to the job file and stores the job file as a print job (step S530). When a printer connecting with the local network 15 is set as the output destination, the print job creation apparatus 20c sets the printer, which has the ID identical with the printer ID of the output destination, to the output destination (step S540), and displays the received print job in the job list field 62 (step S550). FIG. 23 shows an example of management of print jobs when a job file is received. In the illustrated example of FIG. 23, the print job creation apparatus 20c receives a job file, allocates a job ID '000XX' to the received job file, creates the management field 122 including the work management field 122a and the page storage field 122b corresponding to this job ID '000XX', converts the received job file into a print job, and stores the converted print job. As described previously, the contents of the work management field 122a and the page storage field 122b are included in the job file. The job reception routine thus creates only the contents of the management field 122, while not creating the contents of the image registration field 124. The print job creation apparatus 20c displays the print job under creation in the job list filed 62 on the menu window 60 in a similar manner to the interrupted print job. The comment column shows 'Shop A' as the sender of the job file. The display enables the user to identify the received print job and understand the requirement for completion of creation of the print job under creation, execution of the created print job, and delivery of a resulting print to the shop A.

As an example, it is assumed that the print job creation apparatus 20a at the shop A sets the print job creation apparatus 20c at the shop B as the output destination for the combination of the enlargement service and the size A1 on the output destination setting window 66 shown in FIG. 6. The print job creation apparatus 20a creates a print job, in response to the user's selection of enlargement as the desired print service. The user clicks the 'Back to Menu' button 91f on the layout editing window 90 shown in FIG. 13. The ID and the IP address of the print job creation apparatus 20c are set to the output destination for the combination of the enlargement service and the size A1. In response to the click of the 'Back to Menu' button 91f, the print job under creation is sent as a job file including the ID of the print job creation apparatus 20c at the shop B to the job management apparatus 40 and is registered into the job management database 44. When the print job creation apparatus 20c at the shop B outputs a transmission request of a job file to the job management apparatus 40, the job management apparatus 40 sends the job file including the ID of the print job creation apparatus 20c at the shop B to the print job creation apparatus 20c at the shop B. The print job creation apparatus 20c at the shop B stores the received job file and displays the current step 'Layout Editing' of the print job in the status column and the sender of the job file 'shop A' in the comment column in the job list field 62. In response to the user's selection of a print job under creation in the job list filed 62, the interrupted creation of the print job is resumed according to a job resumption process discussed below.

Figure 24:
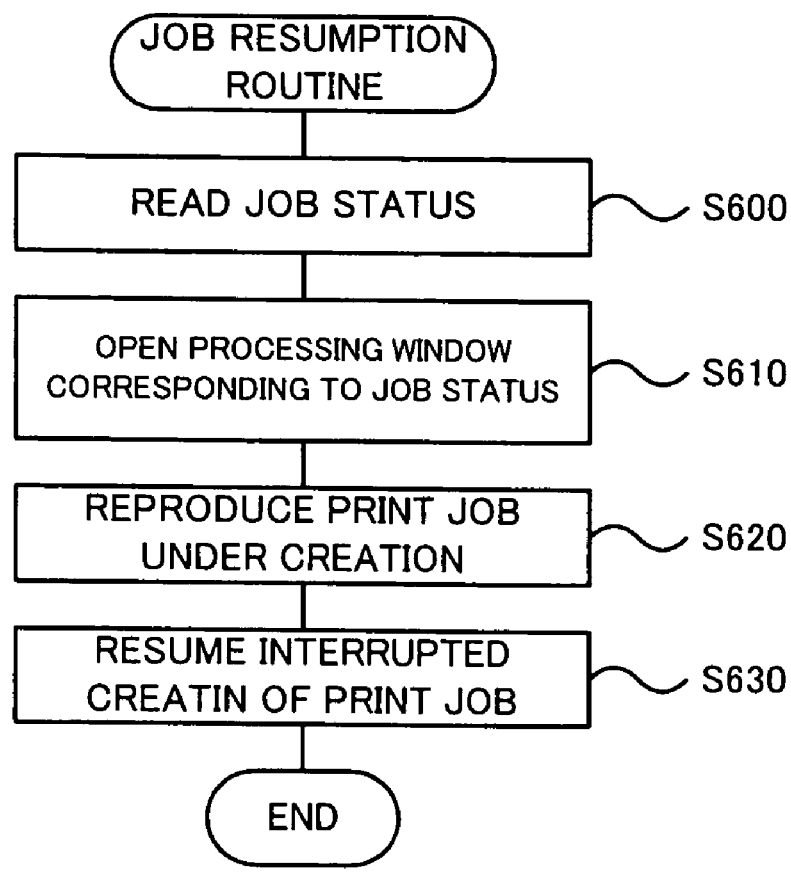
FIG. 24 is a flowchart showing a job resumption routine.

FIG. 24 is a flowchart showing a job resumption routine executed in response to the user's selection of a print job under creation to effectuate a resumption command. This processing routine is executed by the job resumption module 27. When the user selects a print job under creation in the job list field 62 to effectuate a resumption command, the job resumption routine reads the current status of the print job under creation from the corresponding work management field 122a based on its job ID (step S600), opens a processing window corresponding to the current status of the print job under creation (step S610), reproduces the print job under creation with the respective pages stored in the corresponding page storage field 122b (step S620), and resumes the interrupted creation of the print job (step S630). This procedure resumes the interrupted creation of the print job from the interrupted step.

Figure 25:
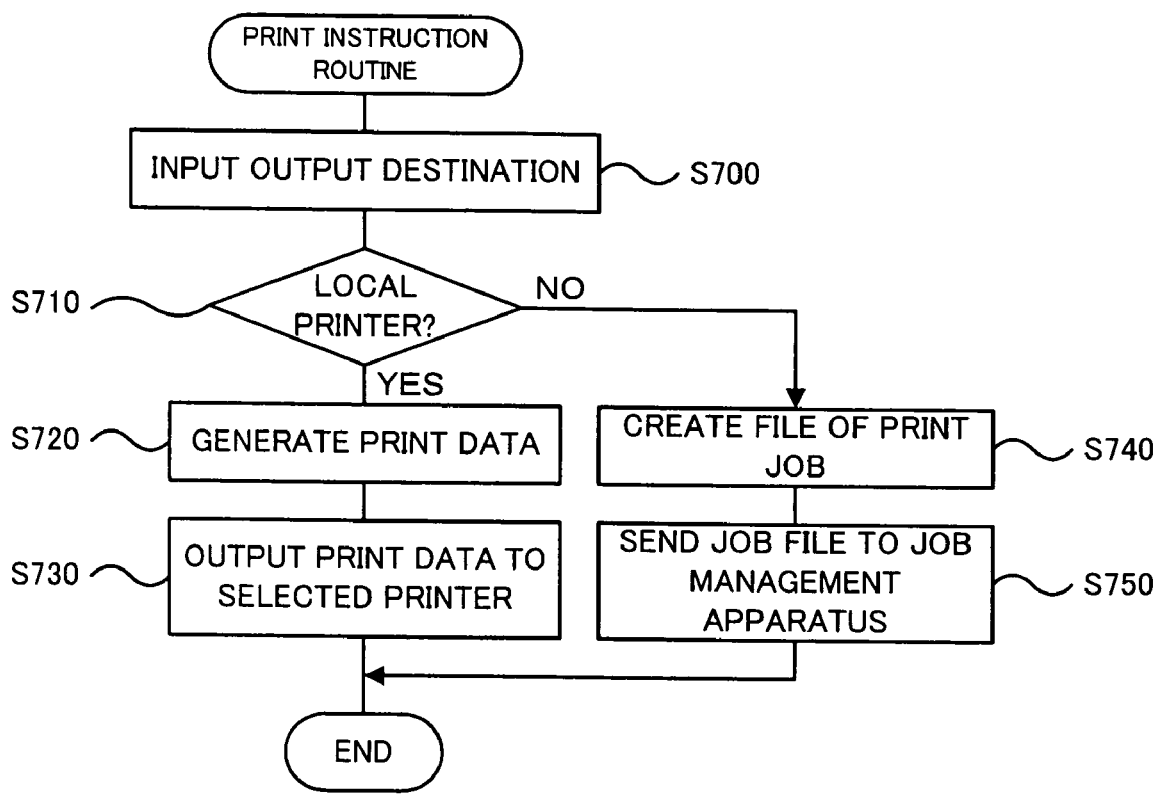
FIG. 25 is a flowchart showing a print instruction routine.

The following describes a series of processing executed in response to a click of the 'Print Start' button 102c in the print window 100. FIG. 25 is a flowchart showing a print instruction routine executed by the print job creation apparatus 20a or 20b in response to a click of the 'Print Start' button 102c. The print instruction routine first receives the output destination to output a print job set in the output destination setting window 66 with respect to the selected combination of the print service and the paper size (step S700), and determines whether the output destination is the local printer (the inkjet printer 46) connecting with the local network 14 at the shop A (step S710). As discussed previously with reference to the output destination setting window 66 of FIG. 6, when the output destination is the local printer, the name of the printer driver installed in the print job creation apparatus 20*a* or 20*b* is set to the output destination. When the output destination is not the local printer, the ID and the IP address of the print job creation apparatus 20*c* connecting with the local network 15 at the shop B and the printer ID of a selected printer are set to the output destination. The decision of step S710 is based on such setting.

When the output destination is the local printer (the inkjet printer 46), the print instruction routine activates the printer driver of the local printer to generate print data (step S720) and outputs the generated print data to the local printer (step S730). The local printer (the inkjet printer 46) executes printing, based on the received print data.

When the output destination is not the local printer (the inkjet printer 46), on the other hand, the print instruction routine creates a file of the print job (step S740) and sends the created job file to the job management apparatus 40 (step S750). The procedure of creating a file of the print job and transmitting the created job file is identical with the procedure discussed above in the job interruption routine. The print job created without any interruption is also output to the output destination set in the output destination setting window 66.

As described above, the print job creation apparatus 20 of the embodiment sets the output destination for each combination of the print service and the paper size on the output destination setting window 66. Print jobs under creation and created print jobs can thus be output automatically to the desired output destination. The output timing of a print job to the selected output destination is restricted to be after the print job creation step selected on the output destination setting window 66. This arrangement effectively prevents the potential trouble of mistakenly outputting a print job to the output destination without necessary processing.

The print job creation apparatus 20 of the embodiment may set another print job creation apparatus 20 connecting with the same local network, as the output destination. For example, one print job creation apparatus 20 accepts an instruction of creating a print job and executes part of the print job creation process to the template selection step, while another print job creation apparatus 20 located at a different place takes charge of the subsequent layout editing step. The print job creation apparatus 20 is also allowed to set a local printer connecting with the same local network, as the output destination. This ensures quick execution of a print job without independently setting the printer at the time of printing.

The print job creation apparatus 20 of the embodiment may set another print job creation apparatus 20 connecting with a different local network, as the output destination. For example, each of print job creation apparatuses 20 located at reception desks in multiple shops accepts an instruction of creating a print job and executes part of the print job creation process to the template selection step, while each of multiple print job creation apparatuses 20 located at a different place from the shops takes charge of the subsequent layout editing step. Namely the multiple print job creation apparatuses 20 located in one place different from the shops specialize in layout editing of a large number of print jobs accepted at the multiple shops. This arrangement enables the labor of creating each print job to be effectively divided into multiple print job creation apparatuses beyond the range of a local network. Setting a printer connecting with a different local network as the output destination enables a created print job to be readily executed by the printer connecting with the different local network.

The print job creation apparatus 20 of the embodiment sets the output destination, the paper type, and the print job creation step for output of the print job in a tabular form. This facilitates setting of the output destination, the paper type, and the print job creation step for output with respect to each combination of the print service and the paper size. Such setting is readily implemented by selection of desired options in the pulldown menus.

The job management apparatus 40 of the embodiment receives a job file sent from each of the print job creation apparatuses 20 as the sender and registers the received job file into the job management database 44. In response to a transmission request from the print job creation apparatus 20 specified as a receiver, a registered job file is sent to the print job creation apparatus 20 of the request sender. Namely the job file is sent to the print job creation apparatus 20 specified as the receiver, regardless of the current status of the print job creation apparatus 20 as the receiver. This arrangement ensures effective management of transmission of job files between multiple print job creation apparatuses 20.

In the print job management system 10 including the print job creation apparatuses 20 and the job management apparatus 40 of the embodiment, the multiple print job creation apparatuses 20 connecting with the different local networks 14 and 15 effectively take charge of respective divisions of the labor of creating each print job and ensure efficient execution of the print job.

In the structure of the embodiment discussed above, each of the print job creation apparatuses 20 is connected with the job management apparatus 40. The print job creation apparatus 20 sends a print job in the form of a job file to the job management apparatus 40 in response to a click of any of the 'Back to Menu' buttons 71*f*, 81*f*, 91*f*, and 101*f* on the image registration window 70, the template selection window 80, the layout editing window 90, and the print window 100 or in response to a click of the 'Print Start' button 102*c* on the print window 100, in the case where the specified output destination is connected with a different local network. The job management apparatus 40 sends the job file to the print job creation apparatus 20 specified as a receiver, in response to a transmission request of the job file from the print job creation apparatus 20 as the receiver. The job management apparatus 40 may, however, be omitted from the system configuration. In this modified structure, a job file is directly sent from the print job creation apparatus 20 as a sender to the print job creation apparatus 20 specified as a receiver.

The print job creation apparatus 20 of the embodiment sets the output destination, the paper type, and the print job creation step for output of the print job with respect to each combination of the print service and the paper size. One possible modification may set the output destination and the print job creation step for output of the print job with respect to each combination of the print service and the paper size, while omitting the paper type from this setting. Another possible modification may set only the output destination with respect to each combination of the print service and the paper size, while omitting the paper type and the print job creation step for output from this setting. It is not essential to set the output destination for each combination of the print service and the paper size, but may be set corresponding to each print service, regardless of the paper size.

The available options of the output destination in the print job creation apparatus 20 of the embodiment include other print job creation apparatuses 20 and local printers connecting with the same local network, as well as other print job creation apparatuses 20 and printers connecting with a different local network. The available options may be only other print job creation apparatuses 20 connecting with the same local network and a different local network, while any printers are excluded from the available options. The available options may otherwise be only printers connecting with the same local network and a different local network, while the other print job creation apparatuses 20 are excluded from the available options. In the latter case, in response to a click of any of the 'Back to Menu' buttons 71f, 81f, 91f, and 101f on the image registration window 70, the template selection window 80, the layout editing window 90, and the print window 100, a job file is output to the print job creation apparatus 20 connecting with a selected printer as the output destination.

The print job creation apparatus 20 of the embodiment sets the output destination, the paper type, and the print job creation step for output of the print job with respect to each combination of the print service and the paper size in a tabular form. This is, however, not restrictive at all, and any format other than the tabular form may be adopted to set the output destination, the paper type, and the print job creation step for output of the print job with respect to each combination of the print service and the paper size. In the structure of the embodiment, the user selects desired entries in the respective pulldown menus to set the output destination, the paper type, and the print job creation step for output of the print job. Any of other diverse methods may be used, instead of the pulldown menus, for setting; for example, the user may directly make desired entries by input of character strings.

The print job creation apparatus 20 of the embodiment enables the user to select a desired print service among the various options, enlargement, digest printing, calendar printing, idea printing, postcard, photo name card, ID photo, index printing, seal printing, and label printing, on the menu window 60. These options of print services are only illustrative and not restrictive in any sense. Only part of these print service options may be set as selectable, or any other print service options different from these options maybe set as selectable. Any of these options may otherwise be combined with any other print service options.

The print job creation apparatus 20 of the embodiment provides the album services and the CD writing services, in addition to the print services. The album services or the CD writing services may be omitted, when not required. The CD writing services may be replaced by writing services into other storage media, for example, flexible disks, MDs, DVDs, and flash memories.

The print job creation apparatus 20 of the embodiment displays the status, the job ID, the selected service, the time of reception, the time of update, the paper size, the number of copies, the output destination, and the comment as the information regarding each print job under creation in the job list field 62. Display of all these pieces of information is only illustrative and is not restrictive in any sense. Only part of these pieces of information may be displayed selectively, or any other different pieces of information may be displayed instead. The display may otherwise include any of these pieces of information in combination with any other different pieces of information.

In the print job creation apparatus 20 of the embodiment, the print job creation process has the four steps, the image registration step, the template selection step, the layout editing step, and the print step, subsequent to selection of a desired print service. This flow of the print job creation process is not restrictive in any sense and may be modified in various ways.

In the print job creation apparatus 20 of the embodiment, interruption of a print job is allowable at any stage in the print job creation process. Interruption of a print job may, however, be allowed at a preset stage in the print job creation process.

The above description regards the details of the print job creation apparatus 20, the details of the job management apparatus 40, and the details of the print job management system 10 including the print job creation apparatus 20 and the job management apparatus 40 as the embodiment of the invention. The technique of the invention may also be actualized by an output destination setting method or a print job creation and output method that adopts the output destination setting method to create and output a print job. Other possible applications of the invention include a program that causes the computer to function as the print job creation apparatus 20, a program that causes the computer to attain the output destination setting method, and a program that causes the computer to attain the print job creation and output method. In such applications, the operations of the print job creation apparatus 20 and the operations of the job management apparatus 40 may be specified as steps and programmed in an appropriate programming language.

The above embodiments are to be considered in all aspects as illustrative and not restrictive. There may be many modifications, changes, and alterations without departing from the scope or sprit of the main characteristics of the present invention. All changes within the meaning and range of equivalency of the claims are therefore intended to be embraced therein.

The disclosure of Japanese patent Application No. 2003-066822 filed on Mar. 12, 2003 and No. 2003-122396 filed on Apr. 25, 2003, including specification, drawings and claims is incorporated herein by reference in its entirety.

What is claimed is:

1. A print job creation apparatus that is connected to a first local network and creates a print job with respect to a print service selected among multiple print service options, said print job creation apparatus comprising:

an output destination setting module that sets, as an output destination of print jobs for each print service, another print job creation apparatus located on a second local network that is linked via a global network with the first local network, and sets a step prior to a layout editing step among a print job creation process including an image registration step, a template selection step, the layout editing step, and a print instruction step, as an allowable output step to allow output of a print job under creation to a preset output destination; and a job output module that, when the output destination of an object print job is set to the another print job creation apparatus located on the second local network and creation of the object print job is completed to the allowable output step and the creation of the object print job is interrupted, outputs the object print job under creation to an output destination set corresponding to a print service of the object print job, among output destinations set by said output destination setting module, so that the layout editing step for the object print job is executed by the another print job creation apparatus located on the second local network.

2. A print job creation apparatus in accordance with claim 1, wherein said output destination setting module sets, as one output destination, another print job creation apparatus located on the first local network, to which said print job creation apparatus is connected.

3. A print job creation apparatus in accordance with claim 1, wherein said output destination setting module specifies a management group name, such as a location or a shop name, in which said another print job creation apparatus is located, to set said another print job creation apparatus as one output destination.

4. A print job creation apparatus in accordance with claim 1, wherein said output destination setting module sets, as one output destination, a print execution device located on the first local network, to which said print job creation apparatus is connected, and said job output module outputs an object print job to said print execution device in response to an execution command of executing the object print job, when said print execution device is set as an output destination for a print service of the object print job.

5. A print job creation apparatus in accordance with claim 4, wherein said output destination setting module uses a driver of said print execution device to set said print execution device as one output destination.

6. A print job creation apparatus in accordance with claim 1, wherein said output destination setting module sets, as one output destination, a print execution device located on the second local network that is linked via the global network with the first local network, to which said print job creation apparatus is connected, and said job output module outputs an object print job to a management apparatus that manages said print execution device in response to an execution command of executing the object print job, when said print execution device is set as an output destination for a print service of the object print job.

7. A print job creation apparatus in accordance with claim 6, wherein said output destination setting module specifies said print execution device and a management group name, such as a location or a shop name, in which said print execution device is located, to set said print execution device as one output destination.

8. A print job creation apparatus in accordance with claim 6, wherein said output destination setting module uses a driver of said print execution device to set said print execution device as one output destination.

9. A print job creation apparatus in accordance with claim 1, wherein said output destination setting module sets an output destination of print jobs for each combination of the print service and a paper size.

10. A print job creation apparatus in accordance with claim 9, wherein said output destination setting module sets an output destination of print jobs for each combination of the print service and a paper type.

11. A print job creation apparatus in accordance with claim 1, wherein said output destination setting module sets an allowable output step in the print job creation process to allow said job output module to output a print job to a preset output destination, and said job output module outputs an object print job, which is completed to a step on or after the allowable output step set by said output destination setting module, to an output destination set corresponding to a print service of the object print job.

12. A print job creation apparatus in accordance with claim 1, wherein said output destination setting module sets the output destination for each print service, in response to selection in a list of available options of output destination displayed in a selectable manner.

13. A print job creation apparatus in accordance with claim 1, wherein said output destination setting module sets the output destination for each print service in a tabular form.

14. A print job creation apparatus in accordance with claim 1, wherein the multiple print services include at least one of an enlargement printing service, a digest printing service, a calendar printing service, a postcard printing service, a photo name card printing service, an ID photograph printing service, a seal printing service, a label printing service, and an album printing service.

15. A print job creation and output method that causes a first computer connected to a first local network to create and output a print job with respect to a print service selected among multiple print service options, said print job creation and output method comprising the steps of:

(a) setting, as an output destination of print jobs for each print service, a second computer located on a second local network that is linked via a global network with the first local network, and setting a step prior to a layout editing step among a print job creation process including an image registration step, a template selection step, the layout editing step, and a print instruction step, as an allowable output step to allow output of a print job under creation to a preset output destination, and storing the settings; and (b) when the output destination of an object print job is set to the second computer located on the second local network and creation of the object print job is completed to the allowable output step and the creation of the object print job is interrupted, outputting the object print job under creation to an output destination set corresponding to a print service of the object print job, among output destinations set and stored in said step (a), so that the layout editing step for the object print job is executed by the second computer located on the second local network.

16. A print job creation and output method in accordance with claim 15, wherein said step (a) sets, as one output destination, a print job creation apparatus located on the first local network, to which said first computer is connected and stores the setting.

17. A print job creation and output method in accordance with claim 15, wherein step (a) sets, as one output destination, a print execution device located on the first local network, to which first said computer is connected and stores the setting, and said step (b) outputs an object print job to said print execution device in response to an execution command of executing the object print job, when said print execution device is set as an output destination for a print service of the object print job.

18. A print job creation and output method in accordance with claim 15, wherein said step (a) sets, as one output destination, a print execution device located on the second local network that is linked via the global network with the first local network, to which said first computer is connected and stores the setting, and said step (b) outputs an object print job to a management apparatus that manages said print execution device in response to an execution command of executing the object print job, when said print execution device is set as an output destination for a print service of the object print job.

19. A print job creation and output method in accordance with claim 15, wherein said step (a) sets an allowable output step in the print job creation process to allow said step (b) to output a print job to a preset output destination and stores the setting, and said step (b) outputs an object print job, which is completed to a step on or after the allowable output step set and stored in said step (a), to an output destination set corresponding to a print service of the object print job.

20. A print job creation and output method in accordance with claim 15, wherein said step (a) sets the output destination for each print service, in response to selection in a list of available options of output destination displayed in a selectable manner and stores the setting.

21. A print job creation and output method in accordance with claim 15, wherein said step (a) sets the output destination for each print service in a tabular form and stores the setting.

* * * * *